(12) United States Patent
Levy

(10) Patent No.: US 8,701,895 B2
(45) Date of Patent: Apr. 22, 2014

(54) FLUID PURIFICATION MEDIA AND SYSTEMS AND METHODS OF USING SAME

(75) Inventor: Ehud Levy, Suwanee, GA (US)

(73) Assignee: Selecto, Inc., Suwanee, GA (US)

( * ) Notice: Subject to any disclaimer, the term of this patent is extended or adjusted under 35 U.S.C. 154(b) by 723 days.

(21) Appl. No.: 12/958,152

(22) Filed: Dec. 1, 2010

(65) Prior Publication Data

US 2011/0278243 A1    Nov. 17, 2011

Related U.S. Application Data

(63) Continuation-in-part of application No. 12/879,064, filed on Sep. 10, 2010.

(60) Provisional application No. 61/333,570, filed on May 11, 2010.

(51) Int. Cl.
*B01D 24/00* (2006.01)

(52) U.S. Cl.
USPC ..................................... 210/510.1

(58) Field of Classification Search
USPC ..................................... 210/510.1
See application file for complete search history.

(56) References Cited

U.S. PATENT DOCUMENTS

| | | | |
|---|---|---|---|
| 4,753,728 A | 6/1988 | VanderBilt et al. | |
| 5,017,318 A | 5/1991 | Vanderbilt et al. | |
| 6,241,893 B1 | 6/2001 | Levy | |
| 6,838,005 B2 | 1/2005 | Tepper et al. | |
| 6,913,154 B2 | 7/2005 | Koslow | |
| 6,959,820 B2 | 11/2005 | Koslow | |
| 7,163,625 B1 | 1/2007 | Williamson et al. | |
| 7,288,498 B1 | 10/2007 | Levy | |
| 7,311,752 B2 | 12/2007 | Tepper et al. | |
| 7,357,868 B2 | 4/2008 | Levy | |
| 7,390,343 B2 | 6/2008 | Tepper et al. | |
| 7,601,262 B1 | 10/2009 | Tepper et al. | |
| 2004/0159605 A1 | 8/2004 | Hughes et al. | |
| 2004/0206682 A1 | 10/2004 | Hamlin et al. | |
| 2006/0000763 A1 | 1/2006 | Rinker et al. | |
| 2006/0207925 A1 | 9/2006 | Levy | |
| 2007/0175196 A1 | 8/2007 | Tepper et al. | |
| 2009/0039028 A1 | 2/2009 | Eaton et al. | |
| 2009/0045133 A1 | 2/2009 | Waterhouse et al. | |

OTHER PUBLICATIONS

International Search Report and Written Opinion corresponding to PCT/US 011/000830 dated Oct. 24, 2011.
Alcoa Aluminum Powder brochure, www.aluminum-powder.com, info@aluminum-powder.com, 8 pages.
Brigano, Dr. Frank A. et al., "Extruded Carbon Block Provides Microbiological Reduction," Indepth Water Disinfection, EverythingAboutWater, May 2009, pp. 32-33.

*Primary Examiner* — Chester Barry
(74) *Attorney, Agent, or Firm* — Dickinson Wright PLLC

(57) ABSTRACT

A fluid purification system, comprising: a first fluid purification media comprising a rigid porous purification block, comprising: a longitudinal first surface; a longitudinal second surface disposed inside the longitudinal first surface; and a porous high density polymer disposed between the longitudinal first surface and the longitudinal second surface; a second fluid purification media, comprising a fibrous, nonwoven fabric disposed adjacent to the first surface of the first fluid purification media, the second surface of the first purification media, or both.

56 Claims, 23 Drawing Sheets

FLUID PURIFICATION MEDIA AND SYSTEMS AND METHODS OF USING SAME

CROSS-REFERENCE TO RELATED APPLICATION

This application is a continuation-in-part of U.S. Ser. No. 12/879,064, filed Sep. 10, 2010,which claims priority under 35 U.S.C. §119(e) to U.S. Provisional Application No. 61/333,570, filed May 11, 2010, the entire content of each of which is incorporated herein by reference, and which claims priority under 35 U.S.C. §119(e) to U.S. Provisional Application No. 61/333,570, filed May 11, 2010.

BACKGROUND

1. Field

Disclosed herein is a purification media comprising a rigid porous polymeric block having an exterior surface and an interior surface, and containing porous, polymeric fabricated to have a wall that is thin, and a pressure drop between the exterior surface and the interior surface that is low, when compared to conventional commercial carbon purification blocks. In particular embodiments, the rigid porous polymeric block is desirably coupled with an additional material disposed on the exterior or interior surface thereof and in particular with a nonwoven fabric containing, an active material, such as aluminum-containing fibers or particles. These aluminum-containing particles or fibers may be in the form of metallic aluminum, alumina, aluminosilicates, or combinations of these. The purification media is suitable for purifying fluids, such as water, thereby removing one or more contaminants from the fluid and for reducing scale formation in equipment in contact with such purified water.

2. Description of Related Art

Diarrhea due to water-borne pathogens in unsafe drinking water is a worldwide problem for many people, particularly in developing countries and emerging economies. While a number of different technologies are available for purifying water, most of these involve some form of mechanical filtration or size exclusion. Such techniques typically involve the use of submicron filters to remove pathogens. These filters, in turn, require elevated water pressure, particularly for point-of-use (POU) water filters, where clean water is expected to flow from a supply source within seconds of being turned on.

Various purification media have been proposed that use blocks of activated carbon particles, zeolites, metal oxides, and other materials. Often, these materials purify fluids by one or more mechanisms, including size exclusion, physical entrapment, or chemical reaction of the contaminants. The latter two mechanisms generally require some physical interaction between the active purification elements (e.g., carbon particles) within the purification media and the contaminant-containing fluid to be purified.

The particles of active purification elements may be dispersed within, or agglomerated by, a binder of some sort, typically a polymeric binder. The design of these media is complex and difficult, typically requiring trade-offs between properties such as the activity of the filtration media in removing contaminants and the pressure drop of fluid across the purification media. For example, decreasing the average particle size of particles in the purification media may increase their activity in removing contaminants by increasing the specific surface area of the particles that is exposed to contaminant-containing fluid. However, such an approach may result in increased pressure drops across the purification media, which actually decreases the flow rate of fluid that may be purified using the purification media. This can lead to the need for multiple filtration systems in order to purify a commercially acceptable amount of fluid. Other design problems include balancing the need for structural integrity of the purification media under fluid pressure with the need for fluid to be able to penetrate the purification media and come into contact with the active purification elements therein.

The need to reduce pressure drop across the purification media is particularly acute in filtration systems that are to be used in developing countries and/or countries with emerging economies. Such systems are often used where the available water pressure is extremely low, typically only a fraction of the water pressure that is generally available in developed countries. For example, municipal water pressure in Mexico City is generally 14-16 psi. Water pressure in Mumbai is generally 12-16 psi, The availability of a low pressure drop purification media would allow for water purification at available water pressures in developing countries without the need to use additional energy pumping the water to a pressure that is generally available in developed countries.

For example, water purification media for use in refrigeration systems, such as residential and commercial refrigerators and freezers containing water lines, ice makers, and the like, generally require purification media that are capable of processing large amounts of water over a significant period of time without the need to change the filter frequently. A relatively low pressure drop in such systems is desirable in emerging economies because of the low water pressure generally available in such countries.

For example in a commercial point of use water purification in the U.S., the available water pressure is typically around 60 psi. However, purification media designed for use under such pressures would not provide adequate water flow in, e.g., Brazil, where the typically available water pressure is from 7-15 psi. Similarly, a purification media that is designed to require a water pressure of 60 psi to produce adequate flow would be unsuitable for use in a water line in a refrigerator in these countries, because water at a much lower pressure is generally all that is available.

At least part of the reason for the inability of conventional water purification systems to operate effectively under low water pressure conditions is the higher design pressure drop noted above. However, this high pressure drop is not simply a function of the design parameters of conventional purification media, but is a function of the particular active purification materials used therein. For example, purification media containing activated carbon derived from coal and the like according to conventional methods and used in conventionally designed purification media would yield a purification media that provides little or no water flow at a water pressure of 10 psi. In this regard, conventional purification media that are designed to remove bacteria from water and are rated at 0.2 micron will not provide adequate flow (if any) at a inlet pressure of 10 psi.

Another reason for the lack of effectiveness of conventional carbon block filters in emerging economies is the high water turbidity often encountered there. This can be due to a number of factors, and may be associated with the presence of pathogens or other contaminants in the water which should be removed to render it safer.

While a combination of a pleated filter element and a carbon block filter has been proposed in U.S. Patent Application Publication No. 2004/0206682. However, the arrangement suggested therein places the pleated filter element around the outer surface of the carbon block filter, so that incoming water encounters the pleated filter block prior to encountering the carbon block filter. Such an arrangement results in clogging and/or exhaustion of the pleated filter with contaminants, resulting in insufficient water flow through the filtration system.

While not wishing to be bound by theory, it is believe that an alternative to impaction and sieving is electrokinetic adsorption, where the media is charged and particles opposite to that charge are attracted and adsorbed. Membranes have been modified to provide some electropositive functionality, but none appear to be suitable for low pressure operating.

Examples of such materials are disclosed in U.S. Pat. Nos. 6,838,005; 7,311,752; 7,390,343; and 7,601,262. These materials, when used as water filtration media, have been found by the present inventions to be unsuitable for low pressure use, despite any suggestions to the contrary in the above cited documents. The present inventors have found that, even at low input pressures, the materials are subject to unsuitable amounts of compression and distortion, so that they are ineffective for practical use. In addition, the solution to this problem suggested by the patentees (placing multiple layers of the fabric in series) results in a significant pressure drop (e.g., 80% of incoming water pressure), making the material unsuitable for a low pressure installation. In addition, the extra layers of nonwoven fabric substantially increase the cost of this proposed solution. The nonwoven fabrics are disclosed to contain nanoalumina fibers.

Attempts to use microbiological interception filters are described in U.S. Pat. Nos. 6,913,154 and 6,959,820. However, these attempts use a so-called silver-cationic material-halide complex. Such a complex is difficult and expensive to prepare and use.

An embodiment of a radial flow purification system is described in U.S. Pat. Nos. 7,229,552 and 7,429,326. These systems do not use a nonwoven pleated fabric.

Another problem typically occurring in water supply systems and in circulating water systems relates to the formulation of mineral scale. Dissolved solids in the water can precipitate onto surfaces of water processing equipment, interfering with the operation of such equipment. For example, heat exchange surfaces in contact with water having mineral solids dissolved therein can become fouled as mineral scale deposits thereon, interfering with the designed heat transfer characteristics of the surface, and rendering a heat exchanger containing such a surface less efficient. Mechanical filtration is of limited usefulness in addressing such problems, as the main cause of scale is typically solids dissolved in the water, rather than suspended solid particles.

Accordingly, there remains a need in the art for a purification media that can provide purification of fluids, such as water, by removing significant quantities of contaminants while the purification system is processing water at significant flow rates with a low pressure drop across the purification media. Such a system must be able to process large quantities of water without clogging or substantially increasing in pressure drop.

Similarly, there remains a need for a water purification system that reduces or eliminates scale formation in equipment used to process water, including water supplied at low input pressures.

In addition to the need for filters that function at low water pressures, there is a need for purification systems that are sufficiently small that they can be incorporated into the water supply lines in household appliances, such as refrigerators, dishwashers, laundry washers, and the like.

SUMMARY

One or more of the embodiments of the fluid purification materials, media, apparatus, and methods described herein satisfies one or more of these needs by providing a rigid porous purification block having a relatively small thickness, and containing at least a porous polymer. Desirably, the porous polymer functions to hold a fluid purification material, as described below. However, whether a fluid purification material is present or not, the rigid porous purification block serves to reduce or avoid direct impingement of fluid onto any downstream fluid purification media, and also to desirably function as a prefilter for such downstream fluid purification media by, e.g., mechanical filtration or size exclusion. The fluid purification media is particularly suited for use in purifying liquids, and in particular water. Because of the ability of the fluid purification media to remove contaminants, such as chlorine, chloramine, microorganisms such as bacteria and viruses, and particulates, it is suitable for use in water purification systems intended to produce potable or drinking water. When carbon is used as a fluid purification material with this particular geometry the rigid porous purification block can be used in a purification system that is capable of removing large amounts of bacteria and other contaminants from water at high flow rates with very low pressure drop.

In one embodiment is disclosed herein a fluid purification media, comprising: a rigid porous purification block, comprising:

a longitudinal first surface;

a longitudinal second surface disposed inside the longitudinal first surface; and a porous high density polymer disposed between the longitudinal first surface and the longitudinal second surface;

wherein said porous purification block has an average pore diameter that ranges between 2,000 and 60,000 Å. Desirably, the rigid porous purification block can further contain a fluid purification material, such as particulate carbon or metal oxides. However, the rigid porous purification block may be 100% porous polymer material, particularly when used in conjunction with a second fluid purification material, such as a fibrous nonwoven fabric. Such a rigid porous purification block can generally have a void volume of 30-70 volume %.

In another embodiment is disclosed herein a carbon material for use in the purification media, i.e., a fluid purification material comprising particles of porous carbon, wherein:

the particles have a porosity of 40-90%, more particularly from 50-90%

In another embodiment is disclosed herein a fluid purification media, comprising:

a fibrous, nonwoven fabric; and a fluid purification material comprising particles of porous carbon having a porosity of 40-90%.

In another embodiment is disclosed herein a purification system comprising a combination of the purification media described herein.

In another embodiment is disclosed a purification apparatus comprising one or more of the purification media described herein.

In another embodiment is disclosed a method of purifying a fluid, such as water, comprising causing the fluid to flow from an exterior surface of the purification media to an interior surface thereof, or conversely.

The carbon material described herein, purification media containing it, and systems containing this purification media, unexpectedly allow for the use of these materials and devices to purify fluids with an extremely low pressure drop. This, in turn, allows these materials and devices to remove contaminants from commercially significant volumes of fluids, in particular water, under low pressure conditions at commercially reasonable flow rates.

In particular, the combination of a rigid porous purification block, whether or not containing a fluid purification material, in conjunction with a nonwoven, fibrous fabric disposed downstream of the porous purification block, and more desirably disposed in a manner that incoming fluid to be treated does not directly impinge on the nonwoven fibrous fabric, has been found to be particularly effective of purifying water at low water pressures. Desirably, the nonwoven fibrous fabric contains a structural fiber, such as microglass fibers, polyolefins (such as polyethylene or polypropylene), polyesters, or the like. Additionally, disposed on, among, or within these structural fibers are particles or fibers of active materials capable of interacting with microorganisms or other impurities with which they came into contact. Examples include alumina particles or fibers, such as nanoscale or microscale alumina fibers or particles, aluminum fibers or particles, such as nanoscale or microscale aluminum fibers or particles, aluminosilicate fibers or particles, such as nanoscale or microscale aluminosilicate fibers or particles more particularly microscale aluminum fibers or particles, titanium dioxide particles, zinc oxide particles, and the like, and combinations of these. While not wishing to be bound by theory, it is believed that these particles have a zeta potential in water that permits the retention and removal from water or various bacteria (e.g. *E. coli*), viruses, cysts, and other potential pathogens.

Of particular interest are a nanowoven fibrous fabrics containing microscale aluminum fibers or particles, or microscale aluminosilicate fibers, or a combination of these disposed between the structure fibers, whether evenly distributed or in clumps. These aluminum and/or aluminosilicate materials can be combined microscale titanium dioxide and/or zinc oxide. A particularly suitable titanium dioxide is available commercially under the tradename P25 (Degussa).

Other suitable active materials include transition metal oxide-aluminosilicate materials described in U.S. Pat. No. 7,288,498 (the entire contents of which are incorporated herein by reference), the metal oxide nanoparticles described in U.S. Pat. No. 7,357,868 (the entire contents of which are incorporated herein by reference), and the aluminosilicate described in U.S. Pat. No. 6,241,893 (the entire contents of which are incorporated herein by reference).

The combination of a rigid porous purification block with a aluminum or aluminosilicate containing pleated nonwoven fabric disposed in the hollow core of the block can, for example, provide 99.99999% reduction of 0.1-5 micron AC dust with only a 10% flow reduction. Commercially available filters tested experienced a 79-92% flow reduction.

In another embodiment is disclosed a fluid purification system comprising: a first fluid purification media comprising a first rigid porous purification block, comprising: a longitudinal first surface; a longitudinal second surface disposed inside the longitudinal first surface; and
a porous high density polymer disposed between the longitudinal first surface and the longitudinal second surface; a second fluid purification media, comprising a fibrous, nonwoven fabric disposed inside the first surface of the first fluid purification media, the second surface of the first purification media, or both; a third fluid purification media comprising a second rigid porous purification block having a longitudinal outer surface and a longitudinal inner surface, wherein the longitudinal inner surface is disposed transversely outside the longitudinal first surface of the first fluid purification media and defining a transverse gap therebetween, or wherein the longitudinal outer surface is disposed inside the longitudinal second surface of the first fluid purification media, and defining a transverse gap therebetween. In a particular embodiment, there is a fourth fluid purification media comprising particles of a fluid purification material disposed in the transverse gap.

Moreover, the combination of a rigid porous purification block as described herein with a nonwoven fibrous fabric containing an active material avoids the need to use expensive silver in the filtration system.

In addition, it has been found that similar beneficial results whether the length of the porous purification block is 6 inches or is 3 inches. As a result, the fluid purification systems and apparatus disclosed herein are suitable for incorporation into appliances such as refrigerators, automatic dishwashers, laundry washers, and other appliances having a water input line.

BRIEF DESCRIPTION OF DRAWINGS

The purification media, systems and methods described herein can be more clearly understood by reference to the accompanying drawings, which are intended to be illustrative, and not limiting, of the appended claims.

DETAILED DESCRIPTION OF SPECIFIC EMBODIMENTS

Figure 1A:
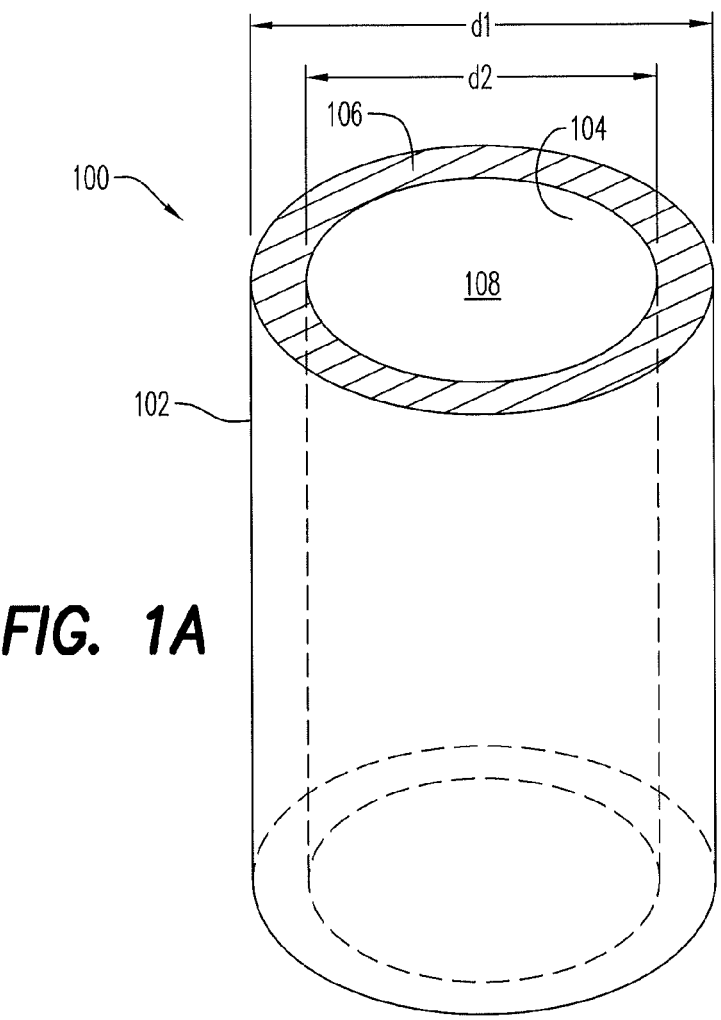
FIG. 1A is a schematic perspective view of one embodiment of a purification media and system described herein.

As used herein, the term "fluid purification material" refers to particles having an active role in removing contaminants from fluid, such as the porous carbon particles described in more detail below or metal oxide nanoparticles, such as zinc oxide, titanium oxide, zirconium oxide, alumina, aluminosilicates, and the like and combinations thereof.

The term "rigid porous purification block" is used to refer to the structure formed by combining particles of a polymer, optionally with one or more fluid purification materials and a binder polymer. Such a block has an first, or exterior, longitudinal surface and a second, or interior longitudinal surface, and a two transverse dimensions perpendicular to the longitudinal direction. As an example, the rigid porous purification block may take the form of a cylindrical annulus, wherein the outer surface of the annulus is the longitudinal first surface and the inner surface of the annulus is the second longitudinal surface, and wherein the diameter of the outer surface is the first transverse dimension and the diameter of the inner surface is the second transverse dimension. However, the scope of the term "rigid porous purification block" is not limited to cylindrical geometry, and other geometries, such as those having an oval, square, or rectangular cross section, are also included.

The term "fluid purification media" is used herein to more generally refer to individual structures capable of purifying fluids, such as a rigid porous purification block or a nonwoven fabric containing a fluid purification material disposed thereon.

The term "fluid purification system" is used herein to refer to a combination of two or more fluid purification media, including but not limited to, a combination of a porous purification block with a nonwoven fabric containing a fluid purification media disposed thereon.

The term "fluid purification apparatus" is used herein to refer to a device containing a fluid purification media or a fluid purification system, along with the associated housing, fluid inlets and outlets, and other components that enable the device to purify a fluid, e.g., water.

As used herein, the term "structural fiber" refers to fibers that provide dimensional stability to the nonwoven fibrous fabric and provide support to an active material disposed thereon.

As used herein, the term "active material" refers to a material disposed on, among, or in the structural fiber of the nonwoven fibrous fabric, and which participates in the removal or reduction of contaminants in the fluid being filtered by a mechanism different from size exclusion or mechanical filtration. Examples of such an active material include carbon particles as described herein, carbon fibers, particles or fibers of alumina, particles or fibers of aluminum, particles or fibers of metal oxides, such as titanium oxide, zinc oxide, zirconium oxide, particles or fibers of aluminosilicates and the like, or combinations of these.

As used herein, the term "about" when used in connection with a numerical value or range includes somewhat more or somewhat less than the numerical value, to a deviation from the numerical value of ±10%.

In one embodiment, a fluid purification material disclosed herein comprises a particulate carbon, and in particular, a porous particulate carbon. Desirably, the porous particulate carbon has a porosity of about 40 to about 90% by volume, more particularly about 50% to about 90%, more particularly, about 70 to 85%, even more particularly, around 75%, as measured by nitrogen intrusion. Desirably, the average pore diameter ranges between 60 Å 20.000 Å. Desirably, the particles have a bulk density of 0.4 to 0.9 g/cm$^3$, more particularly, around 0.78 g/cm$^3$. Desirably, the particles have a specific surface area of from 1500 to 2000 m$^2$/g, measured by the Brunauer-Emmett-Teller (BET) technique. Such a fluid purification material is particularly suited for use in the first fluid purification media by, e.g., incorporation into the first rigid porous purification block. In addition, the fluid purification material is also suitable for use in the third fluid purification media, and/or as the fluid purification material of the fourth fluid purification media.

Figure 4:
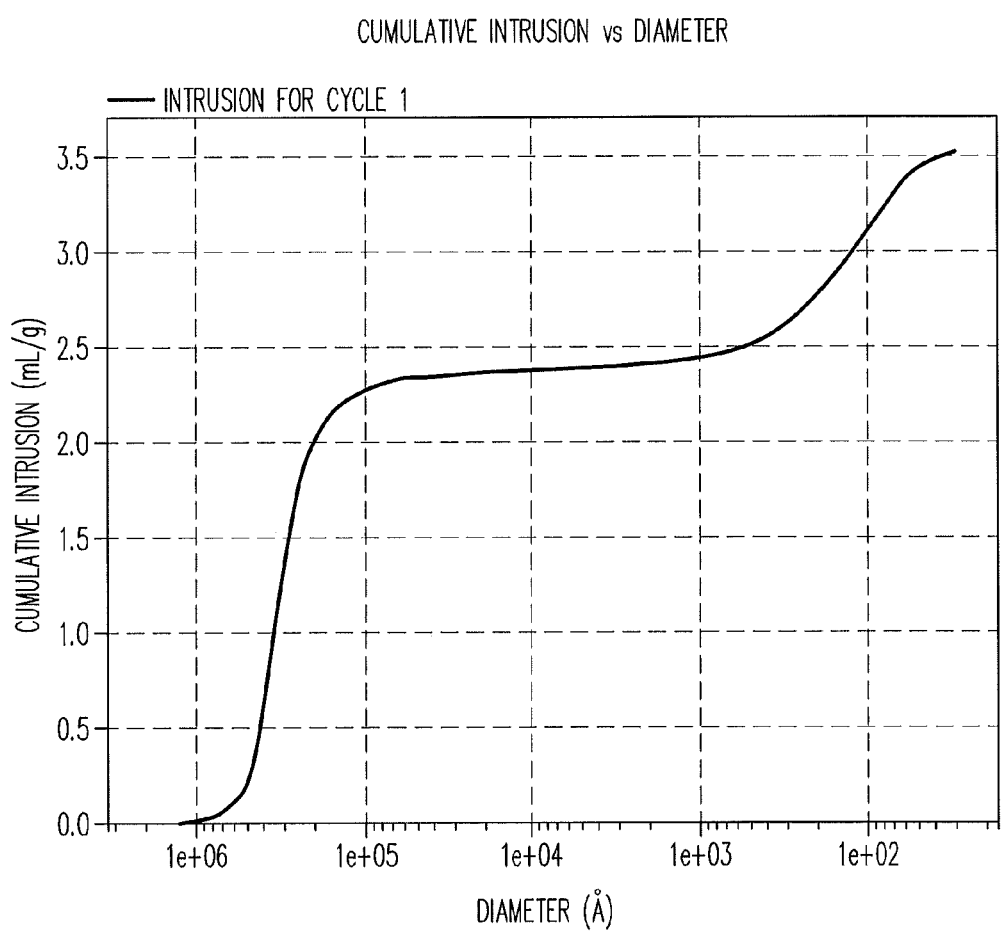
FIG. 4 is a graph of cumulative Hg intrusion vs. diameter for an embodiment of porous carbon used in an embodiment of porous purification block disclosed herein.
Figure 5:
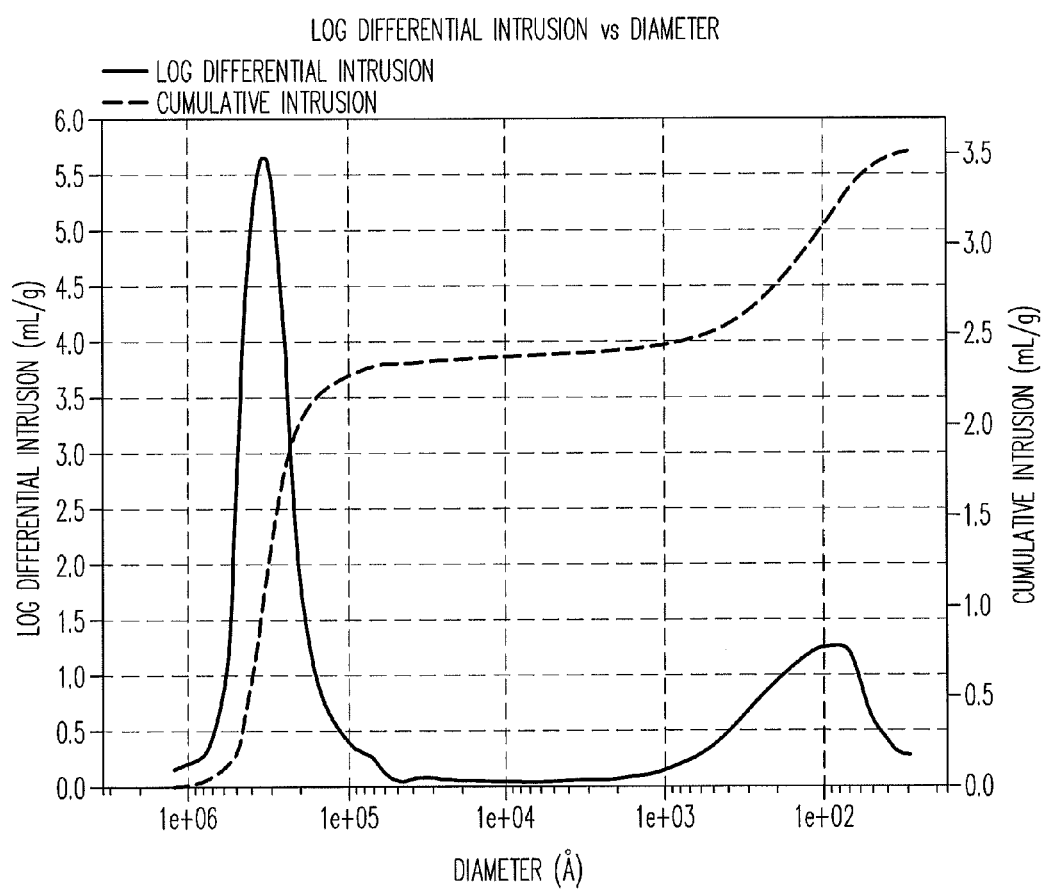
FIG. 5 is a graph of log differential intrusion vs. diameter for the porous carbon of FIG. 4.
Figure 6:
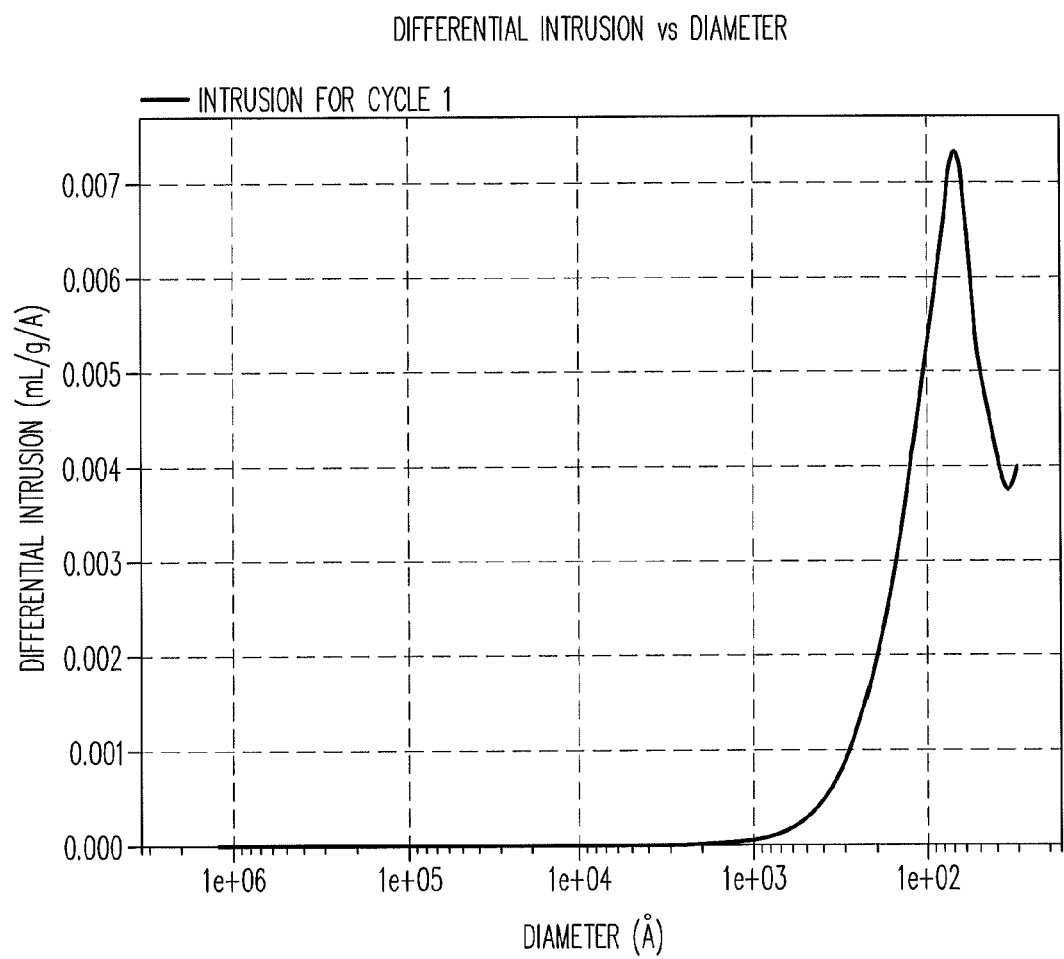
FIG. 6 is a graph of differential intrusion vs. diameter for the porous carbon of FIG. 4.
Figure 7:
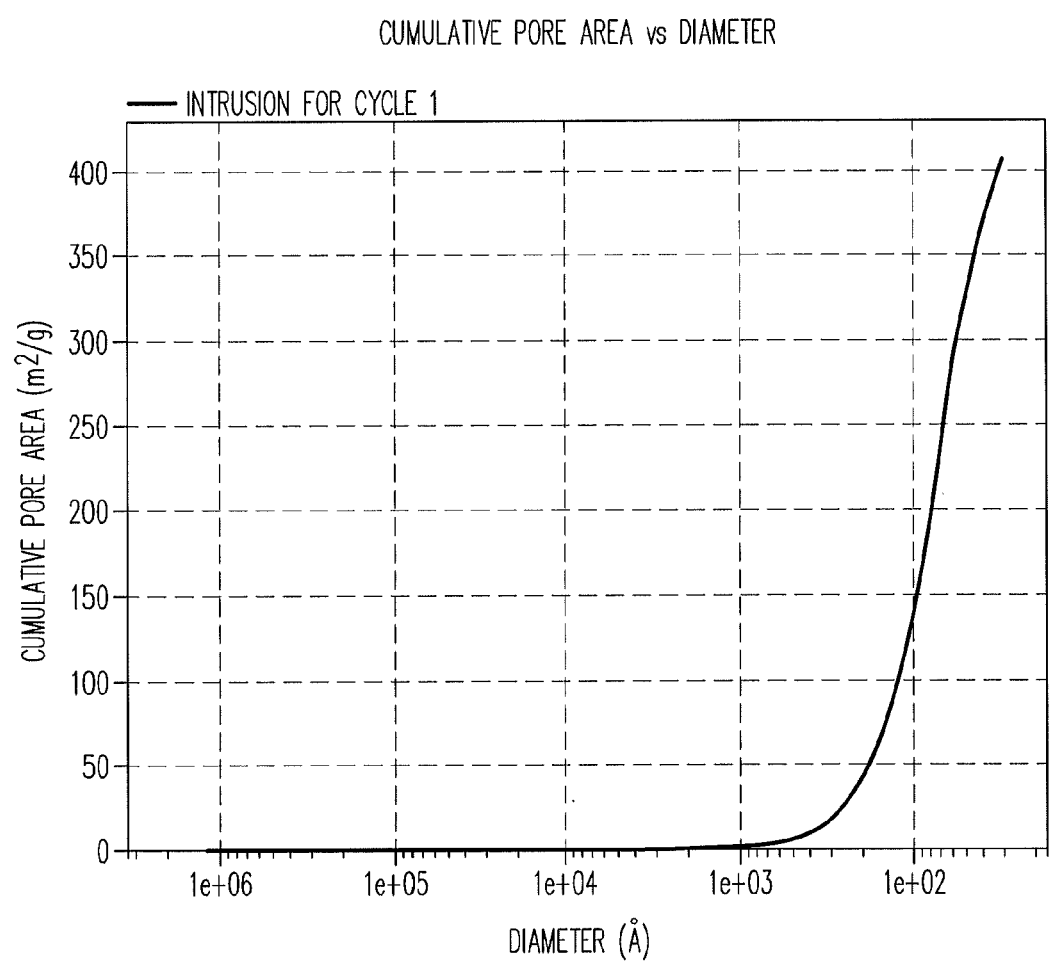
FIG. 7 is a graph of cumulative pore area vs. diameter for the porous carbon of FIG. 4.
Figure 8:
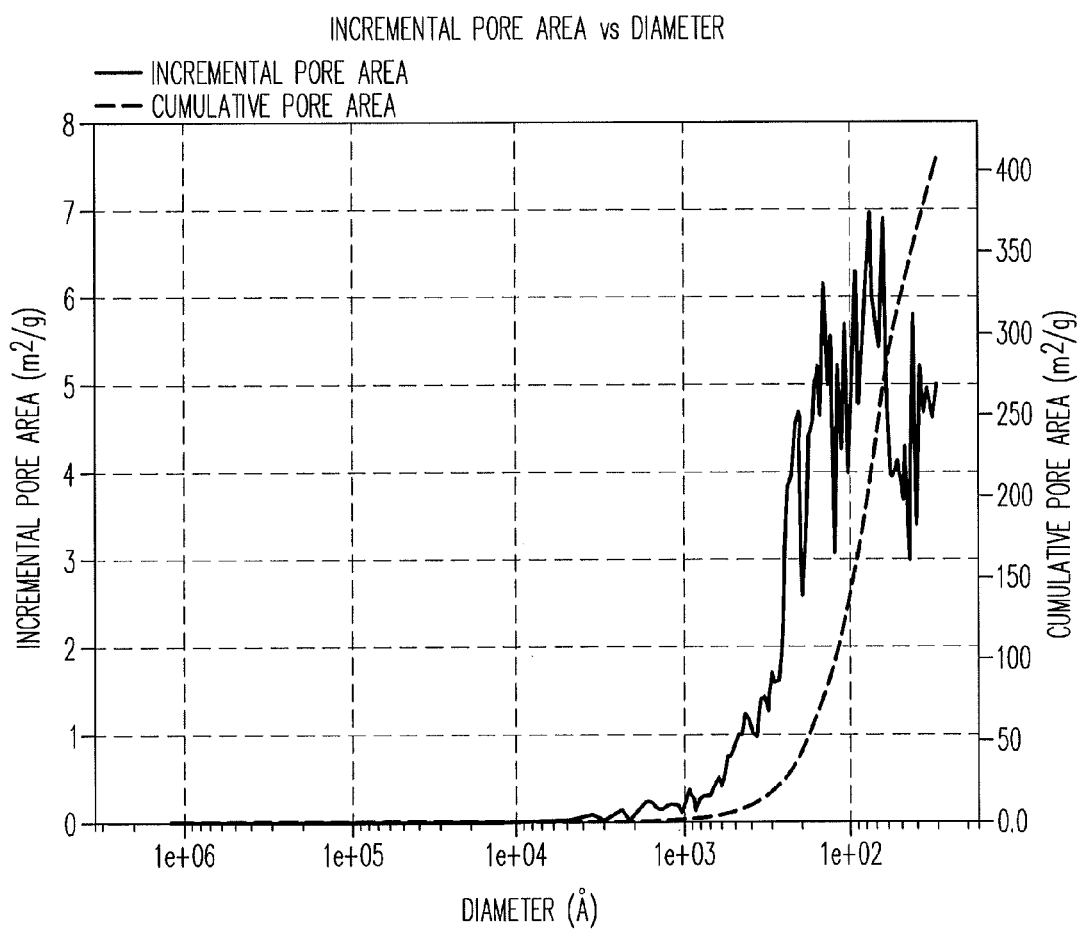
FIG. 8 is a graph of incremental pore area vs. diameter for the porous carbon of FIG. 4.

A particular suitable carbon for this fluid purification material was analyzed by Hg intrusion to assess its pore size distribution and other properties, and the results are given in Table 1. A graph of cumulative intrusion vs. diameter is given in FIG. 4. A graph of log differential intrusion vs. diameter is given in FIG. 5. A graph of differential intrusion vs. diameter is given in FIG. 6. A graph of cumulative pore area vs. diameter is given in FIG. 7. A graph of incremental pore area vs. diameter is given in FIG. 8.

TABLE 1

Summary Report

Penetrometer: 389-(10) 5 Bulb, 1.131 Stem, Powder

| | | | |
|---|---|---|---|
| Pen. Constant: | 21.630 µL/pF | Adv. Contact Angle: | 130.000 degrees |
| Pen. Weight: | 63.6931 g | Rec. Contact Angle: | 130.000 degrees |
| Stem Volume: | 1.1310 mL | Hg Surface Tension: | 485.000 dynes/cm |
| Max. Head Pressure: | 4.4500 psia | Hg Density: | 13.5335 g/mL |
| Pen. Volume: | 5.9250 mL | Sample Weight: | 0.3203 g |
| | | Assembly Weight: | 125.4047 g |

Low Pressure:

| | |
|---|---|
| Evacuation Pressure: | 50.000 µmHg |
| Evacuation Time: | 5 mins |
| Mercury Filling Pressure: | 1.46 psia |
| Equilibration Time: | 10 secs |

High Pressure:

| | |
|---|---|
| Equilibration Time: | 10 secs |

No Blank Correction

Intrusion Data Summary

| | |
|---|---|
| Total Intrusion Volume = | 3.5100 mL/g |
| Total Pore Area = | 406.678 m$^2$/g |

TABLE 1-continued

| | |
|---|---|
| Median Pore Diameter (Volume) = | 250806 A |
| Median Pore Diameter (Area) = | 77 A |
| Average Pore Diameter (4 V/A) = | 345 A |
| Bulk Density = | 0.2306 g/mL |
| Apparent (skeletal) Density = | 1.2110 g/mL |
| Porosity = | 80.9546% |
| Stem Volume Used = | 99%**** |

Tabular Report

| Mean Diameter (A) | Cumulative Pore Volume (mL/g) | Incremental Pore Volume (mL/g) | Cumulative Pore Area (m²/g) | Incremental Pore Area (m²/g) | % of Total Intrusion Volume |
|---|---|---|---|---|---|
| 1240882 | 0.0000 | 0.0000 | 0.000 | 0.000 | 0.0000 |
| 1049811 | 0.0242 | 0.0242 | 0.001 | 0.001 | 0.6891 |
| 719934 | 0.1248 | 0.1007 | 0.007 | 0.006 | 3.5569 |
| 510838 | 0.4092 | 0.2843 | 0.029 | 0.022 | 11.6570 |
| 382462 | 1.1856 | 0.7765 | 0.110 | 0.081 | 33.7787 |
| 289673 | 1.7237 | 0.5380 | 0.184 | 0.074 | 49.1074 |
| 233019 | 1.9650 | 0.2413 | 0.226 | 0.041 | 55.9814 |
| 191168 | 2.1124 | 0.1475 | 0.257 | 0.031 | 60.1834 |
| 154902 | 2.1966 | 0.0842 | 0.278 | 0.022 | 62.5817 |
| 125598 | 2.2482 | 0.0516 | 0.295 | 0.016 | 64.0511 |
| 101492 | 2.2870 | 0.0388 | 0.310 | 0.015 | 65.1556 |
| 84446 | 2.3059 | 0.0190 | 0.319 | 0.009 | 65.6961 |
| 75438 | 2.3159 | 0.0100 | 0.324 | 0.005 | 65.9798 |
| 66309 | 2.3345 | 0.0186 | 0.335 | 0.011 | 66.5102 |
| 52497 | 2.3380 | 0.0035 | 0.338 | 0.003 | 66.6085 |
| 40420 | 2.3445 | 0.0065 | 0.345 | 0.006 | 66.7950 |
| 32854 | 2.3514 | 0.0069 | 0.353 | 0.008 | 66.9917 |
| 26622 | 2.3576 | 0.0062 | 0.362 | 0.009 | 67.1681 |
| 21561 | 2.3621 | 0.0045 | 0.371 | 0.008 | 67.2970 |
| 17605 | 2.3661 | 0.0039 | 0.380 | 0.009 | 67.4089 |
| 14308 | 2.3699 | 0.0038 | 0.390 | 0.011 | 67.5174 |
| 11569 | 2.3740 | 0.0042 | 0.405 | 0.014 | 67.6361 |
| 9200 | 2.3777 | 0.0037 | 0.421 | 0.016 | 67.7412 |
| 7346 | 2.3812 | 0.0035 | 0.440 | 0.019 | 67.8396 |
| 6008 | 2.3845 | 0.0033 | 0.462 | 0.022 | 67.9345 |
| 4466 | 2.3943 | 0.0098 | 0.549 | 0.087 | 68.2126 |
| 3432 | 2.3948 | 0.0005 | 0.555 | 0.006 | 68.2262 |
| 2841 | 2.4043 | 0.0095 | 0.689 | 0.134 | 68.4975 |
| 2289 | 2.4049 | 0.0006 | 0.699 | 0.010 | 68.5145 |
| 1909 | 2.4161 | 0.0112 | 0.934 | 0.235 | 68.8333 |
| 1473 | 2.4212 | 0.0051 | 1.073 | 0.139 | 68.9791 |
| 1294 | 2.4275 | 0.0063 | 1.268 | 0.195 | 69.1588 |
| 1141 | 2.4336 | 0.0061 | 1.481 | 0.213 | 69.3318 |
| 1051 | 2.4358 | 0.0023 | 1.567 | 0.086 | 69.3962 |
| 966 | 2.4450 | 0.0092 | 1.946 | 0.379 | 69.6573 |
| 876 | 2.4494 | 0.0044 | 2.147 | 0.201 | 69.7828 |
| 819 | 2.4555 | 0.0061 | 2.444 | 0.296 | 69.9558 |
| 765 | 2.4611 | 0.0056 | 2.736 | 0.292 | 70.1152 |
| 722 | 2.4662 | 0.0051 | 3.020 | 0.284 | 70.2610 |
| 683 | 2.4724 | 0.0062 | 3.382 | 0.363 | 70.4374 |
| 639 | 2.4808 | 0.0085 | 3.912 | 0.529 | 70.6782 |
| 601 | 2.4865 | 0.0057 | 4.292 | 0.380 | 70.8410 |
| 565 | 2.4972 | 0.0107 | 5.051 | 0.759 | 71.1462 |
| 525 | 2.5071 | 0.0099 | 5.804 | 0.753 | 71.4277 |
| 489 | 2.5191 | 0.0120 | 6.788 | 0.984 | 71.7702 |
| 456 | 2.5307 | 0.0115 | 7.802 | 1.013 | 72.0991 |
| 425 | 2.5452 | 0.0145 | 9.168 | 1.367 | 72.5129 |
| 401 | 2.5539 | 0.0087 | 10.035 | 0.867 | 72.7605 |
| 383 | 2.5647 | 0.0108 | 11.167 | 1.132 | 73.0691 |
| 366 | 2.5738 | 0.0090 | 12.156 | 0.989 | 73.3268 |
| 349 | 2.5874 | 0.0136 | 13.711 | 1.555 | 73.7134 |
| 332 | 2.5987 | 0.0113 | 15.073 | 1.362 | 74.0356 |
| 319 | 2.6093 | 0.0106 | 16.402 | 1.330 | 74.3375 |
| 306 | 2.6218 | 0.0125 | 18.037 | 1.635 | 74.6936 |
| 293 | 2.6333 | 0.0115 | 19.611 | 1.574 | 75.0225 |
| 282 | 2.6453 | 0.0120 | 21.315 | 1.704 | 75.3651 |
| 272 | 2.6558 | 0.0105 | 22.854 | 1.539 | 75.6635 |
| 262 | 2.6696 | 0.0138 | 24.959 | 2.105 | 76.0569 |
| 248 | 2.6934 | 0.0238 | 28.796 | 3.837 | 76.7352 |
| 232 | 2.7162 | 0.0227 | 32.711 | 3.915 | 77.3829 |
| 218 | 2.7416 | 0.0255 | 37.391 | 4.680 | 78.1087 |
| 204 | 2.7650 | 0.0233 | 41.955 | 4.564 | 78.7734 |
| 195 | 2.7776 | 0.0126 | 44.537 | 2.582 | 79.1329 |
| 189 | 2.7915 | 0.0139 | 47.479 | 2.942 | 79.5297 |
| 182 | 2.8116 | 0.0201 | 51.900 | 4.421 | 80.1028 |
| 174 | 2.8297 | 0.0181 | 56.054 | 4.155 | 80.6183 |
| 167 | 2.8505 | 0.0208 | 61.050 | 4.996 | 81.2118 |
| 159 | 2.8710 | 0.0205 | 66.189 | 5.139 | 81.7951 |
| 153 | 2.8890 | 0.0180 | 70.892 | 4.703 | 82.3072 |
| 146 | 2.9121 | 0.0231 | 77.202 | 6.309 | 82.9651 |
| 140 | 2.9299 | 0.0179 | 82.293 | 5.091 | 83.4738 |
| 135 | 2.9519 | 0.0219 | 88.796 | 6.503 | 84.0978 |
| 130 | 2.9630 | 0.0112 | 92.230 | 3.434 | 84.4166 |
| 127 | 2.9760 | 0.0130 | 96.307 | 4.077 | 84.7863 |
| 125 | 2.9846 | 0.0086 | 99.057 | 2.750 | 85.0305 |
| 122 | 2.9983 | 0.0137 | 103.543 | 4.486 | 85.4205 |
| 118 | 3.0152 | 0.0169 | 109.249 | 5.706 | 85.9020 |
| 115 | 3.0262 | 0.0111 | 113.088 | 3.839 | 86.2174 |
| 113 | 3.0397 | 0.0135 | 117.860 | 4.772 | 86.6007 |
| 110 | 3.0552 | 0.0155 | 123.503 | 5.643 | 87.0415 |
| 107 | 3.0680 | 0.0129 | 128.319 | 4.815 | 87.4078 |
| 105 | 3.0779 | 0.0099 | 132.098 | 3.779 | 87.6893 |
| 103 | 3.0886 | 0.0107 | 136.275 | 4.177 | 87.9945 |
| 100 | 3.1004 | 0.0118 | 140.966 | 4.691 | 88.3303 |
| 98 | 3.1121 | 0.0117 | 145.710 | 4.744 | 88.6626 |
| 97 | 3.1197 | 0.0076 | 148.862 | 3.153 | 88.8797 |
| 95 | 3.1330 | 0.0133 | 154.486 | 5.624 | 89.2595 |
| 92 | 3.1504 | 0.0174 | 162.031 | 7.544 | 89.7546 |
| 90 | 3.1606 | 0.0102 | 166.589 | 4.559 | 90.0463 |
| 88 | 3.1737 | 0.0131 | 172.546 | 5.957 | 90.4194 |
| 86 | 3.1843 | 0.0106 | 177.472 | 4.926 | 90.7212 |
| 84 | 3.1965 | 0.0121 | 183.235 | 5.763 | 91.0671 |
| 83 | 3.2067 | 0.0102 | 188.193 | 4.958 | 91.3588 |
| 81 | 3.2202 | 0.0135 | 194.851 | 6.658 | 91.7420 |
| 79 | 3.2347 | 0.0145 | 202.228 | 7.377 | 92.1557 |
| 77 | 3.2474 | 0.0127 | 208.862 | 6.634 | 92.5186 |
| 75 | 3.2562 | 0.0088 | 213.540 | 4.678 | 92.7696 |
| 74 | 3.2684 | 0.0121 | 220.111 | 6.570 | 93.1155 |
| 73 | 3.2765 | 0.0081 | 224.572 | 4.461 | 93.3461 |
| 71 | 3.2860 | 0.0095 | 229.904 | 5.332 | 93.6174 |
| 70 | 3.2954 | 0.0094 | 235.260 | 5.356 | 93.8854 |
| 69 | 3.3061 | 0.0107 | 241.476 | 6.215 | 94.1906 |
| 68 | 3.3163 | 0.0102 | 247.532 | 6.057 | 94.4822 |
| 66 | 3.3252 | 0.0088 | 252.838 | 5.306 | 94.7332 |
| 65 | 3.3327 | 0.0075 | 257.425 | 4.587 | 94.9469 |
| 64 | 3.3397 | 0.0070 | 261.780 | 4.356 | 95.1469 |
| 63 | 3.3513 | 0.0117 | 269.160 | 7.380 | 95.4793 |
| 62 | 3.3588 | 0.0075 | 274.008 | 4.847 | 95.6929 |
| 61 | 3.3665 | 0.0076 | 279.020 | 5.012 | 95.9100 |
| 60 | 3.3728 | 0.0063 | 283.243 | 4.224 | 96.0897 |
| 59 | 3.3785 | 0.0057 | 287.129 | 3.885 | 96.2525 |
| 58 | 3.3837 | 0.0052 | 290.744 | 3.615 | 96.4017 |
| 57 | 3.3898 | 0.0061 | 295.002 | 4.259 | 96.5747 |
| 56 | 3.3946 | 0.0048 | 298.396 | 3.394 | 96.7104 |
| 55 | 3.3998 | 0.0052 | 302.188 | 3.792 | 96.8596 |
| 54 | 3.4054 | 0.0056 | 306.313 | 4.125 | 97.0190 |
| 53 | 3.4096 | 0.0042 | 309.435 | 3.122 | 97.1377 |
| 53 | 3.4146 | 0.0050 | 313.240 | 3.805 | 97.2801 |
| 51 | 3.4209 | 0.0063 | 318.148 | 4.908 | 97.4599 |
| 50 | 3.4259 | 0.0050 | 322.125 | 3.977 | 97.6023 |
| 49 | 3.4306 | 0.0048 | 325.987 | 3.862 | 97.7380 |
| 48 | 3.4351 | 0.0045 | 329.726 | 3.738 | 97.8668 |
| 47 | 3.4401 | 0.0050 | 333.941 | 4.215 | 98.0093 |
| 46 | 3.4444 | 0.0043 | 337.628 | 3.687 | 98.1314 |
| 46 | 3.4488 | 0.0044 | 341.492 | 3.864 | 98.2568 |
| 45 | 3.4520 | 0.0032 | 344.360 | 2.868 | 98.3484 |
| 44 | 3.4550 | 0.0030 | 347.049 | 2.689 | 98.4332 |
| 43 | 3.4612 | 0.0062 | 352.775 | 5.726 | 98.6095 |
| 42 | 3.4651 | 0.0039 | 356.513 | 3.738 | 98.7214 |
| 41 | 3.4686 | 0.0035 | 359.861 | 3.348 | 98.8198 |
| 40 | 3.4723 | 0.0037 | 363.506 | 3.645 | 98.9249 |
| 39 | 3.4774 | 0.0051 | 368.698 | 5.192 | 99.0708 |
| 38 | 3.4822 | 0.0048 | 373.689 | 4.992 | 99.2064 |
| 37 | 3.4864 | 0.0043 | 378.322 | 4.632 | 99.3285 |
| 36 | 3.4892 | 0.0027 | 381.347 | 3.025 | 99.4065 |
| 35 | 3.4950 | 0.0058 | 388.011 | 6.664 | 99.5727 |
| 34 | 3.4988 | 0.0038 | 392.543 | 4.533 | 99.6812 |
| 33 | 3.5023 | 0.0035 | 396.763 | 4.220 | 99.7796 |
| 32 | 3.5062 | 0.0039 | 401.714 | 4.951 | 99.8915 |
| 31 | 3.5100 | 0.0038 | 406.678 | 4.963 | 100.0000 |

In a particular embodiment, the carbon particles have an average particle size in the range of about 10 to 200 μm, more particularly, about 10 to 100 μm. In a particular embodiment, the particles have a particle size distribution such that 5-25% by weight of the particles are smaller than 325 mesh and 7% by weight of the particles are larger than 80 mesh. Desirably, such particles are obtained from a wood-based carbon, rather than from a coal based carbon. In some circumstances, a coconut-shell based carbon can be used, although a wood-based carbon is more desirable for ease of handling and processing. The carbon particles can be sized by suitable sizing methods and their average size and size distribution adjusted by screening and measuring methods known in the art, such as using a laser measurement device, such as a Coulter Multisizer. Sizing and screening can occur before or after the additional processing described herein.

In a particular embodiment, the additional processing of the particles includes acid reacting. More specifically, this can desirably comprise introducing the particles into a reactor, where they are contacted with strong phosphoric acid (desirably, 85-99%) under a pressure of 200-300 psi for a period of time ranging between 1-4 hours, desirably about 1 hour. Following this reaction, the particles are washed with water and transferred to a furnace for heat treating. Desirably, the particles are heat treated in a furnace in e.g., nitrogen, ammonia, or $CO_2$ atmosphere, at a temperature ranging between about 700° and 1000° C., more particularly between about 700° and 890° C. for a period of time, generally ranging from about 5 to about 24 hours. The result of this processing is carbon particles having a porosity of 50-90%, by volume. The carbon is sufficiently active that one gram can process 470 gallons of water having a chlorine content of 2 ppm, which is removed from the water by the carbon. If necessary or desirable, the particles can ground further, e.g., in an air jet, in order to adjust their size characteristics.

The carbon particles can then be formed into a rigid porous purification block by combination with a porous polymeric binder. Such a rigid porous purification block is, e.g., suitable for use as a first fluid purification media. In general, it is desirable to use a carbon loading of about 10-30% by weight, more particularly about 15-30% based on the total weight of the porous purification block. The porous purification block can desirably contain from about 65 to 90%, more particularly about 70 to 90%, even more particularly, about 70-85% by weight of porous polymer, such as high density polyethylene (HDPE) polypropylene, or ultra high molecular weight polyethylene (UHMWPE). Desirably, the HDPE can have an average molecular weight of around 700,000. Desirably, the porous purification block can have average pore sizes ranging between 2,000 and 60,000 Å, more particularly between 10,000 and 60,000 Å. Desirably, the void volume of the porous block can be 30-70%, more particularly, about 40%. The porous purification block can be produced by a number of different processes, such as blow molding, extrusion, and the like. Desirably, the polymeric material of the porous purification block has a micron rating from 10-150.

Additionally or alternatively, the rigid porous purification block can contain other fluid purification materials in addition to, or in place of, the carbon particles. These can include, zinc oxide, e.g., nanoparticulate zinc oxide, ranging from about 0.01 to about 0.1%, more particularly about 0.06%, by weight, based on the total weight of the porous purification block. Other suitable fluid purification materials include zeolite particles, zirconia particles, alumina nanofibers (e.g., in amounts ranging from 2-3% by weight, based on the total weight of the porous purification block), aluminosilicate fibers or particles, and the like.

For example, a rigid porous purification block can be formed by combining 80% by weight HDPE and 20% by weight of a combination of aluminosilicate and nanozinc particles (Alusilnz™, Selecto, Inc.).

In a particular embodiment, the rigid porous purification block can be formed by mixing the fluid purification materials, e.g. the particulate carbon described above, with particles of porous polymer in a mold of the size and shape of the desired porous purification block, and heating in an oven. Desirably, the particles of porous polymer have an average particle size in the range of 10-50 μm, more particularly, 20-40 μm. Desirably, the binder particles have a high porosity relative to the porosity of typical polymeric binders. Porosities of 40-70% are desirable. The mixture can desirably be heated in the mold for about 45 minutes at a temperature of around 400° F.

Figure 15:
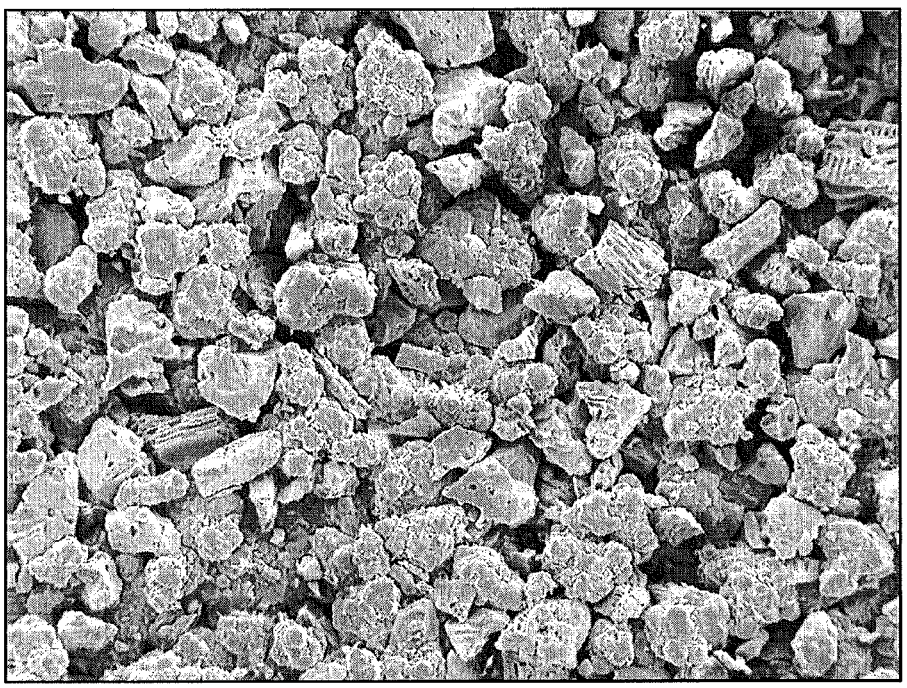
FIG. 15 is a photomicrograph of a mixture of porous carbon and polymer according to an embodiment disclosed herein.
Figure 16:
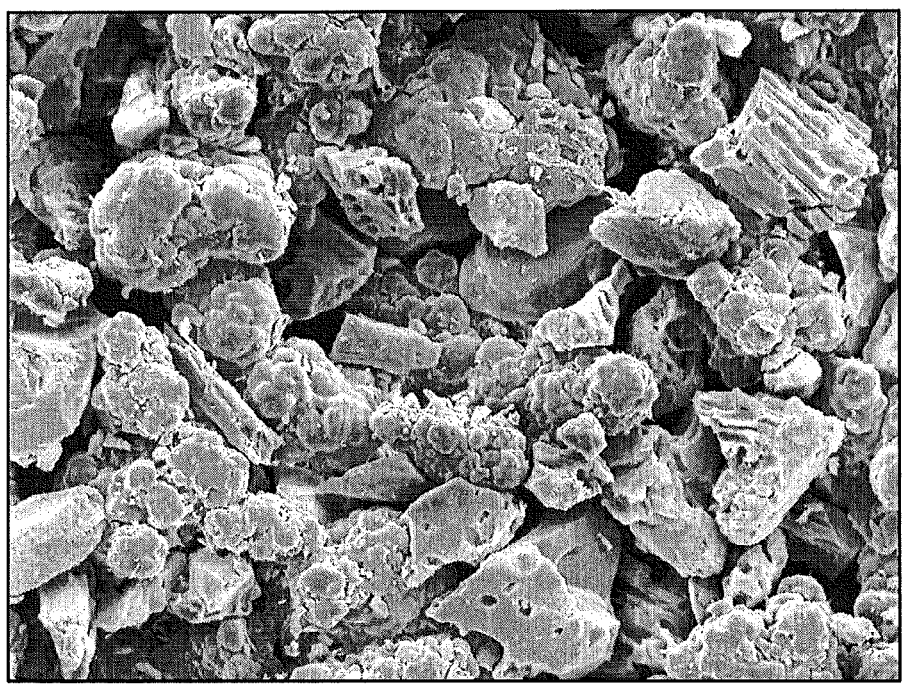
FIG. 16 is a magnified portion of the material shown in FIG. 15.
Figure 17:
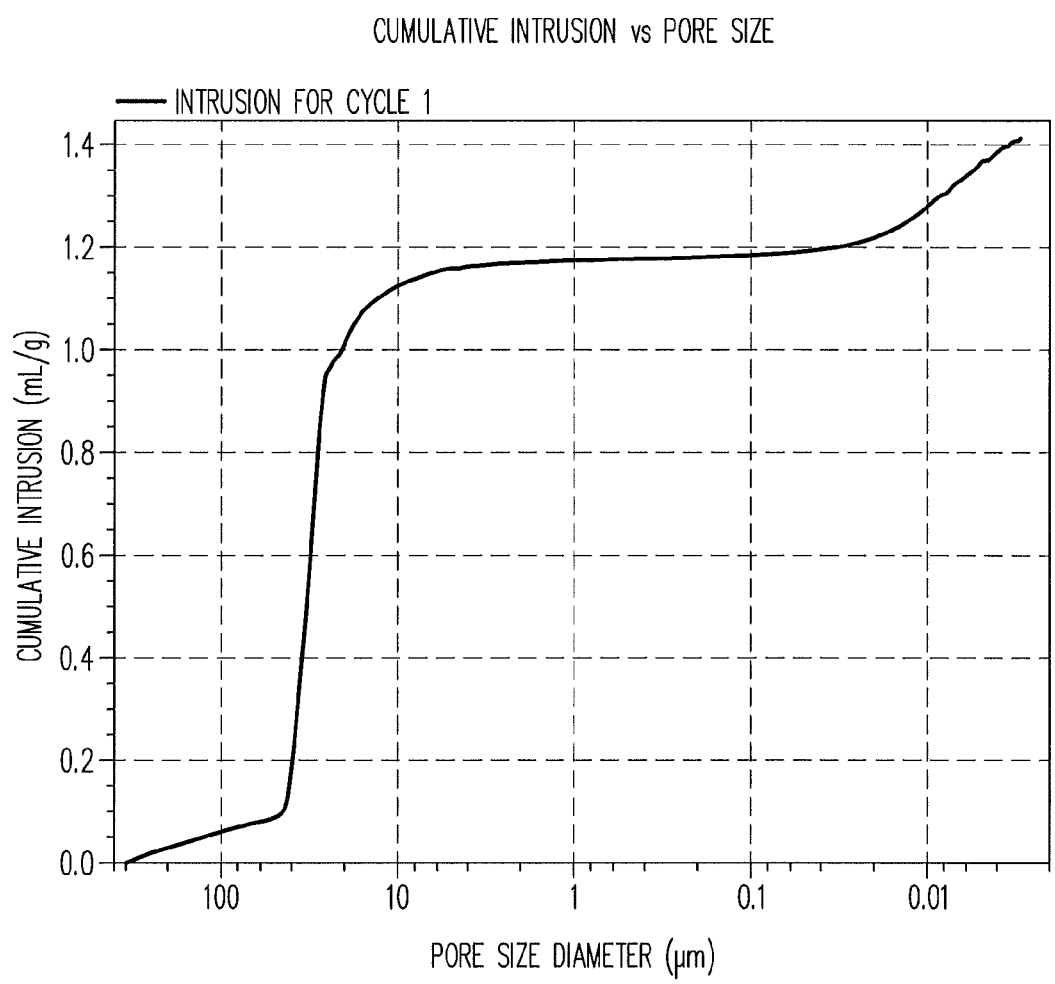
FIG. 17 is a graph of cumulative Hg intrusion vs. pore size for an embodiment of rigid porous purification block disclosed herein.
Figure 18:
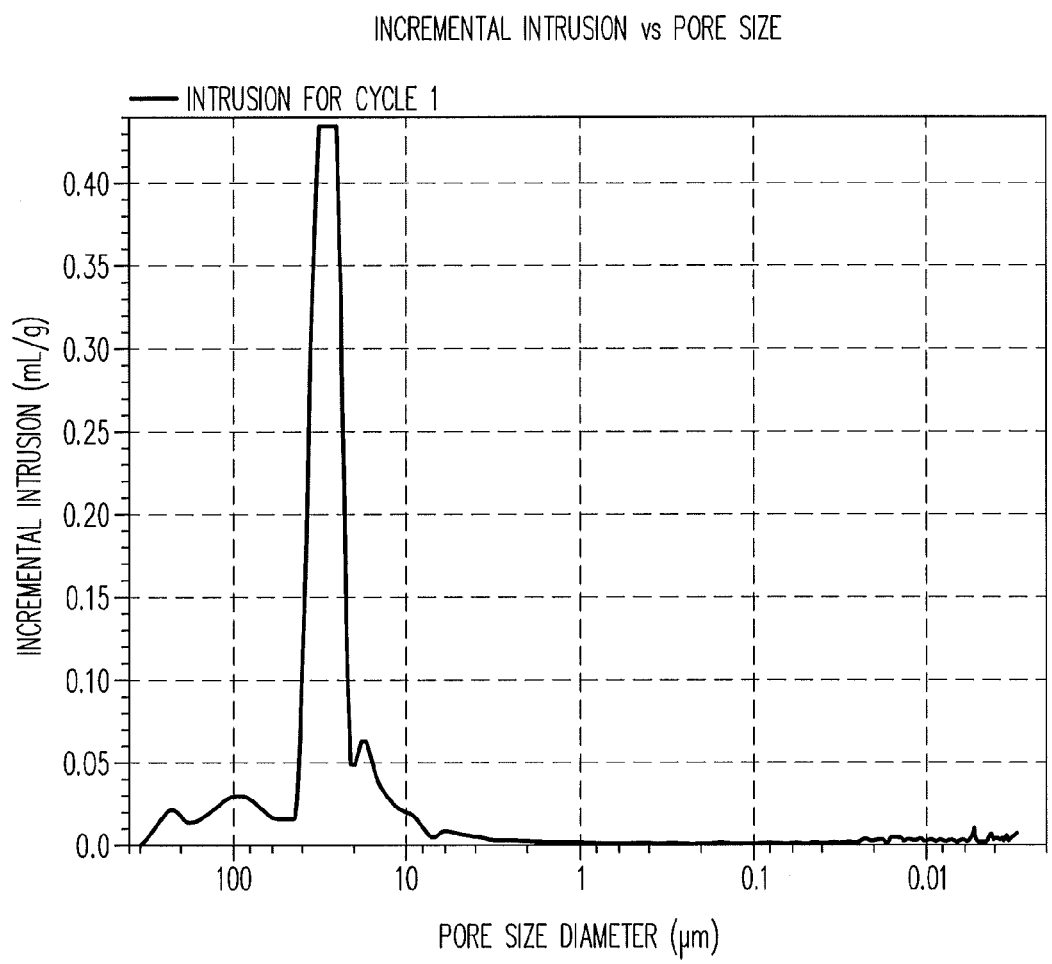
FIG. 18 is a graph of incremental intrusion vs. pore size for the embodiment of FIG. 17.
Figure 19:
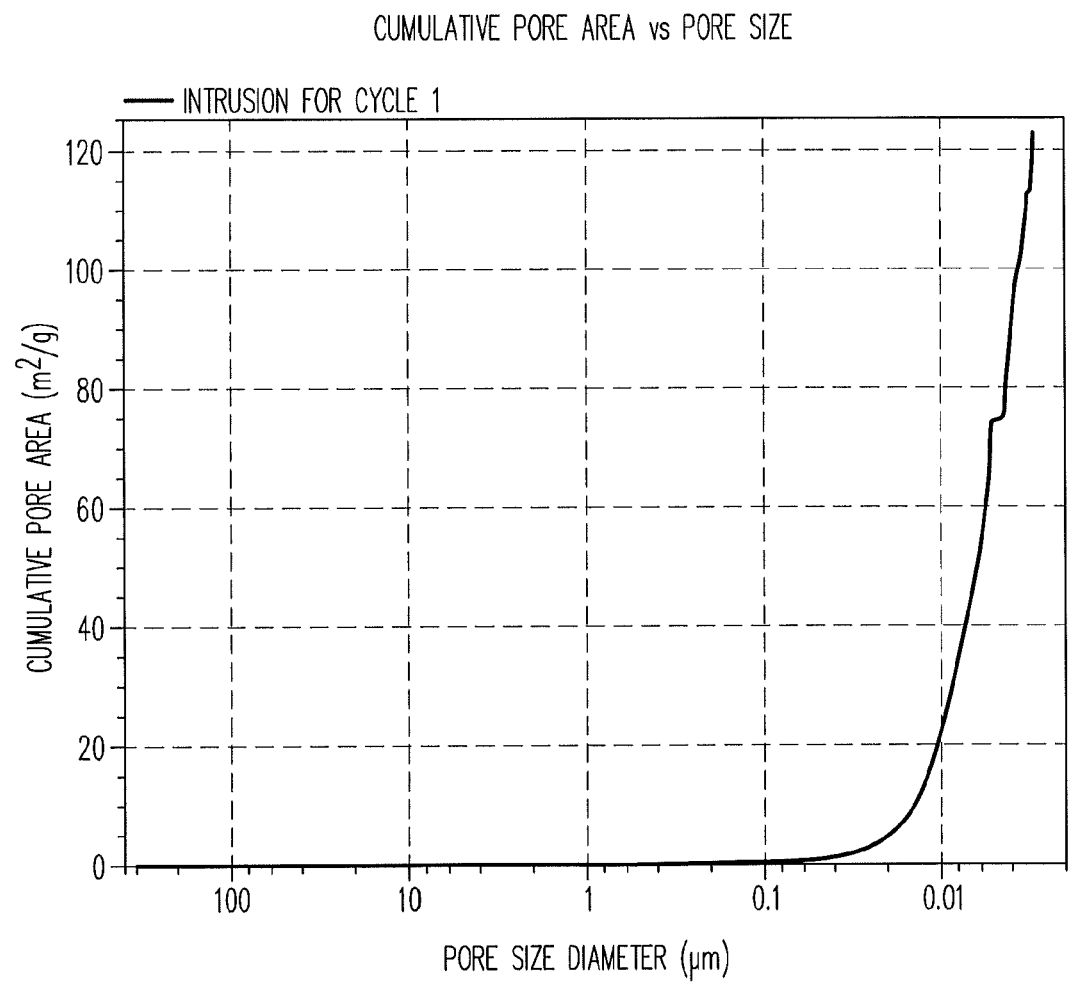
FIG. 19 is a graph of cumulative pore area vs. pore size for the embodiment of FIG. 17.
Figure 20:
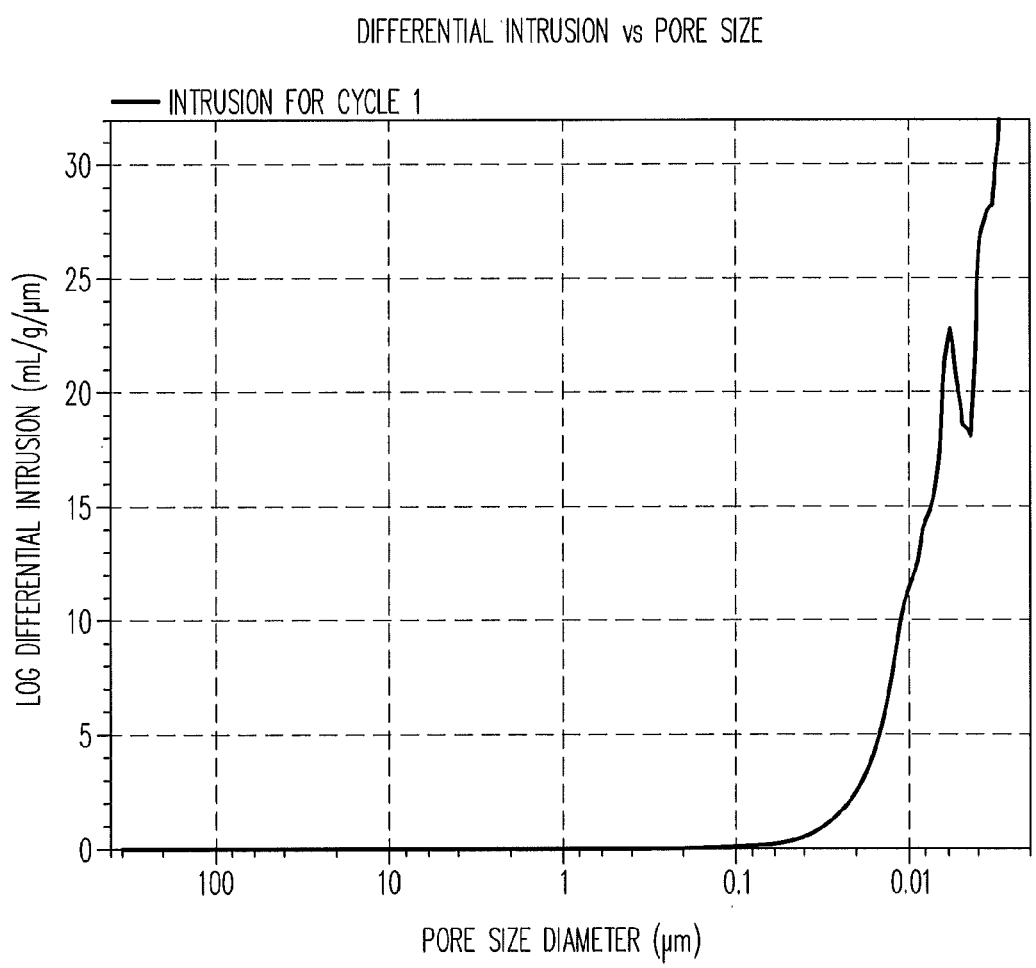
FIG. 20 is a graph of differential intrusion vs. pore size for the embodiment of FIG. 17.
Figure 21:
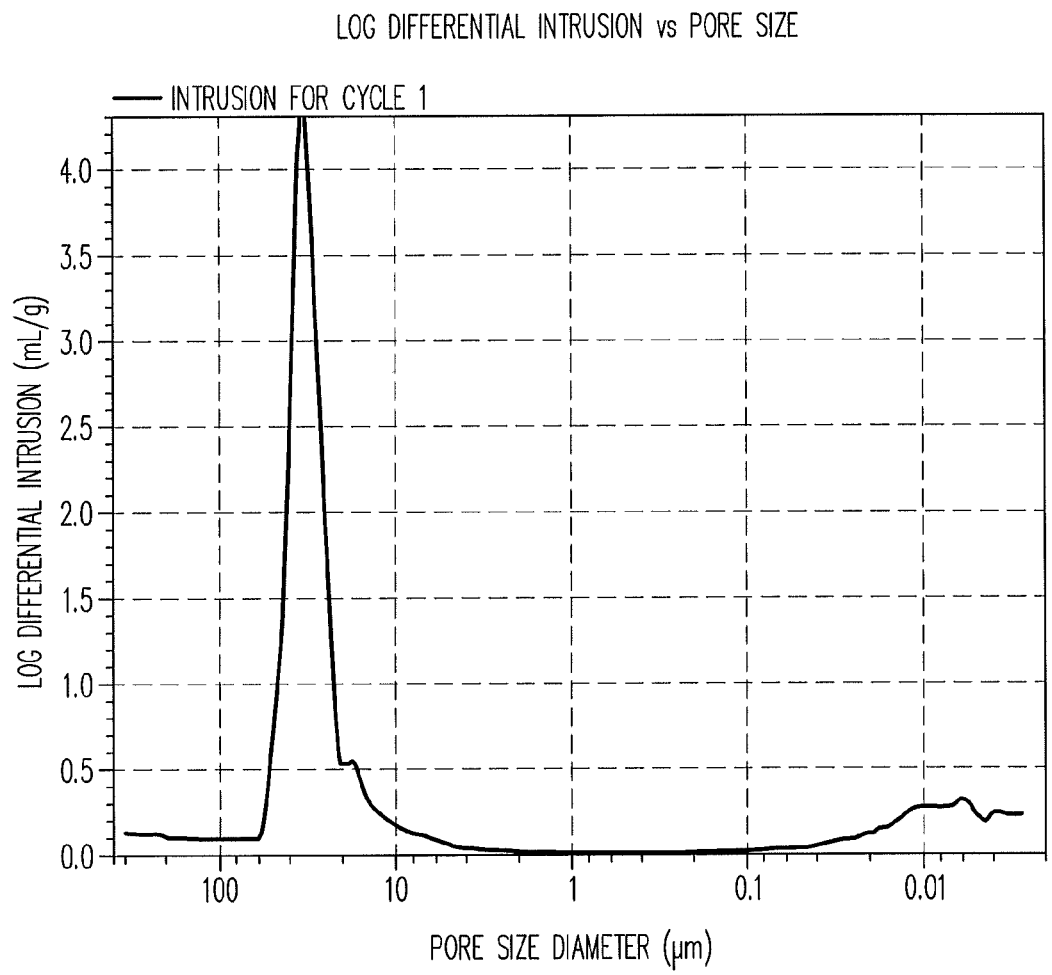
FIG. 21 is a graph of log differential intrusion vs. pore size for the embodiment of FIG. 17.

A micrograph of a suitable material containing 27 wt % porous carbon in porous polymer is given in FIG. 15. A magnified portion of this micrograph is given in FIG. 16.

The porous purification block can then be allowed to cool and removed from the mold. If desired, the outer surface, and in particular, the longitudinal first surface, of the porous purification block can be coated with a layer of porous polymer, such as a HDPE, desirably the same or similar HDPE to that used to make the porous purification block. Desirably, such a coating can have a thickness ranging from ⅟30 to ⅟40 of the thickness of the porous purification block.

A particular rigid porous purification block containing 70% HDPE, 29% porous carbon and 1% zinc oxide was analyzed by Hg intrusion to assess its pore size distribution and other properties. The results are given in Table 2 below, and graphs showing cumulative Hg intrusion, incremental intrusion, cumulative pore area, differential intrusion, and log differential intrusion, each as a function of pore size, are given in FIG. 17 to FIG. 21, respectively.

Alternatively, the rigid porous purification block can be prepared using only the HDPE, without the inclusion of a fluid purification material dispersed therein. The procedures forming such a block are essentially those described herein, but without the addition of the fluid purification material.

TABLE 2

| Summary Report | | | |
|---|---|---|---|
| Penetrometer parameters Penetrometer: 674-(24) 15 Bulb, 3.263 Stem, Solid | | | |
| Pen. Constant: | 32.477 μL/pF | Pen. Weight: | 74.9934 g |
| Stem Volume: | 3.2630 mL | Max. Head Pressure: | 4.4500 psia |
| Pen. Volume: | 17.7011 mL | Assembly Weight: | 295.6950 g |
| Hg Parameters | | | |
| Adv. Contact Angle: | 130.000 degrees | Rec. Contact Angle: | 130.000 degrees |
| Hg Surface Tension: | 485.000 dynes/cm | Hg Density: | 13.5335 g/mL |
| Low Pressure: | | | |
| Evacuation Pressure: | | 50 μmHg | |
| Evacuation Time: | | 5 mins | |
| Mercury Filling Pressure: | | 0.52 psia | |
| Equilibration Time: | | 10 secs | |

TABLE 2-continued

High Pressure:

| | |
|---|---|
| Equilibration Time: | 10 secs |
| No Blank Correction | |

Intrusion Data Summary

| | |
|---|---|
| Total Intrusion Volume = | 1.4145 mL/g |
| Total Pore Area = | 122.459 m²/g |
| Median Pore Diameter (Volume) = | 29.8983 μm |
| Median Pore Diameter (Area) = | 0.0056 μm |
| Average Pore Diameter (4 V/A) = | 0.0462 μm |
| Bulk Density at 0.52 psia = | 0.4373 g/mL |
| Apparent (skeletal) Density = | 1.1467 g/mL |
| Porosity = | 61.8609% |
| Stem Volume Used = | 27% |

Tabular Report

| Pressure (psia) | Pore Diameter (μm) | Cumulative Pore Volume (mL/g) | Incremental Pore Volume (mL/g) | Cumulative Pore Area (m²/g) | Incremental Pore Area (m²/g) |
|---|---|---|---|---|---|
| 0.52 | 345.2103 | 0.0000 | 0.0000 | 0.000 | 0.000 |
| 0.75 | 239.7468 | 0.0209 | 0.0209 | 0.000 | 0.000 |
| 1.00 | 180.6952 | 0.0344 | 0.0135 | 0.001 | 0.000 |
| 2.00 | 90.4928 | 0.0638 | 0.0294 | 0.001 | 0.001 |
| 2.99 | 60.4679 | 0.0796 | 0.0159 | 0.002 | 0.001 |
| 3.99 | 45.3138 | 0.0953 | 0.0157 | 0.003 | 0.001 |
| 5.49 | 32.9469 | 0.5164 | 0.4211 | 0.046 | 0.043 |
| 6.99 | 25.8893 | 0.9506 | 0.4343 | 0.106 | 0.059 |
| 8.48 | 21.3271 | 0.9995 | 0.0488 | 0.114 | 0.008 |
| 10.48 | 17.2563 | 1.0622 | 0.0627 | 0.127 | 0.013 |
| 12.97 | 13.9415 | 1.0956 | 0.0334 | 0.135 | 0.009 |
| 15.96 | 11.3322 | 1.1179 | 0.0223 | 0.142 | 0.007 |
| 19.99 | 9.0458 | 1.1343 | 0.0164 | 0.149 | 0.006 |
| 23.00 | 7.8651 | 1.1420 | 0.0077 | 0.152 | 0.004 |
| 24.99 | 7.2376 | 1.1463 | 0.0043 | 0.155 | 0.002 |
| 29.97 | 6.0346 | 1.1546 | 0.0083 | 0.160 | 0.005 |
| 37.19 | 4.8629 | 1.1607 | 0.0061 | 0.164 | 0.004 |
| 46.73 | 3.8703 | 1.1649 | 0.0042 | 0.168 | 0.004 |
| 56.56 | 3.1979 | 1.1674 | 0.0026 | 0.171 | 0.003 |
| 71.56 | 2.5273 | 1.1701 | 0.0026 | 0.175 | 0.004 |
| 86.84 | 2.0827 | 1.1718 | 0.0018 | 0.178 | 0.003 |
| 111.77 | 1.6182 | 1.1732 | 0.0014 | 0.181 | 0.003 |
| 136.32 | 1.3268 | 1.1744 | 0.0012 | 0.184 | 0.003 |
| 172.04 | 1.0513 | 1.1757 | 0.0012 | 0.188 | 0.004 |
| 216.71 | 0.8346 | 1.1766 | 0.0009 | 0.192 | 0.004 |
| 266.17 | 0.6795 | 1.1773 | 0.0008 | 0.196 | 0.004 |
| 326.16 | 0.5545 | 1.1780 | 0.0007 | 0.201 | 0.005 |
| 416.99 | 0.4337 | 1.1790 | 0.0009 | 0.208 | 0.007 |
| 517.43 | 0.3495 | 1.1795 | 0.0005 | 0.213 | 0.005 |
| 636.69 | 0.2841 | 1.1804 | 0.0009 | 0.225 | 0.012 |
| 697.71 | 0.2592 | 1.1807 | 0.0003 | 0.230 | 0.005 |
| 797.38 | 0.2268 | 1.1812 | 0.0005 | 0.238 | 0.008 |
| 988.74 | 0.1829 | 1.1818 | 0.0006 | 0.250 | 0.012 |
| 1196.07 | 0.1512 | 1.1831 | 0.0013 | 0.281 | 0.031 |
| 1297.77 | 0.1394 | 1.1837 | 0.0005 | 0.296 | 0.015 |
| 1394.85 | 0.1297 | 1.1838 | 0.0001 | 0.298 | 0.003 |
| 1496.36 | 0.1209 | 1.1843 | 0.0006 | 0.317 | 0.018 |
| 1595.88 | 0.1133 | 1.1850 | 0.0006 | 0.339 | 0.022 |
| 1697.96 | 0.1065 | 1.1854 | 0.0004 | 0.353 | 0.014 |
| 1895.42 | 0.0954 | 1.1861 | 0.0007 | 0.382 | 0.030 |
| 2043.26 | 0.0885 | 1.1865 | 0.0004 | 0.401 | 0.018 |
| 2194.29 | 0.0824 | 1.1875 | 0.0010 | 0.446 | 0.045 |
| 2345.37 | 0.0771 | 1.1882 | 0.0007 | 0.482 | 0.037 |
| 2493.60 | 0.0725 | 1.1890 | 0.0008 | 0.525 | 0.042 |
| 2643.82 | 0.0684 | 1.1894 | 0.0003 | 0.544 | 0.020 |
| 2693.72 | 0.0671 | 1.1896 | 0.0002 | 0.558 | 0.014 |
| 2843.87 | 0.0636 | 1.1905 | 0.0009 | 0.615 | 0.057 |
| 2993.85 | 0.0604 | 1.1913 | 0.0008 | 0.666 | 0.051 |
| 3241.79 | 0.0558 | 1.1929 | 0.0016 | 0.778 | 0.112 |
| 3492.39 | 0.0518 | 1.1932 | 0.0003 | 0.798 | 0.020 |
| 3741.54 | 0.0483 | 1.1939 | 0.0007 | 0.852 | 0.054 |
| 3991.53 | 0.0453 | 1.1956 | 0.0017 | 0.996 | 0.144 |
| 4240.89 | 0.0426 | 1.1971 | 0.0016 | 1.137 | 0.141 |
| 4485.04 | 0.0403 | 1.1976 | 0.0005 | 1.185 | 0.048 |
| 4725.80 | 0.0383 | 1.1979 | 0.0003 | 1.217 | 0.032 |
| 4984.19 | 0.0363 | 1.1998 | 0.0018 | 1.413 | 0.195 |
| 5282.39 | 0.0342 | 1.2016 | 0.0019 | 1.625 | 0.213 |
| 5481.95 | 0.0330 | 1.2029 | 0.0013 | 1.780 | 0.155 |
| 5729.80 | 0.0316 | 1.2035 | 0.0005 | 1.847 | 0.067 |
| 5982.28 | 0.0302 | 1.2050 | 0.0016 | 2.049 | 0.202 |
| 6229.87 | 0.0290 | 1.2069 | 0.0019 | 2.305 | 0.256 |
| 6481.35 | 0.0279 | 1.2083 | 0.0013 | 2.493 | 0.188 |
| 6729.38 | 0.0269 | 1.2095 | 0.0013 | 2.678 | 0.185 |
| 6978.08 | 0.0259 | 1.2105 | 0.0010 | 2.827 | 0.149 |
| 7474.02 | 0.0242 | 1.2133 | 0.0028 | 3.279 | 0.451 |
| 7974.09 | 0.0227 | 1.2170 | 0.0036 | 3.900 | 0.622 |
| 8473.08 | 0.0213 | 1.2182 | 0.0012 | 4.119 | 0.219 |
| 8973.45 | 0.0202 | 1.2214 | 0.0032 | 4.730 | 0.611 |
| 9269.06 | 0.0195 | 1.2235 | 0.0021 | 5.155 | 0.425 |
| 9568.18 | 0.0189 | 1.2264 | 0.0029 | 5.763 | 0.608 |
| 10019.11 | 0.0181 | 1.2292 | 0.0028 | 6.364 | 0.601 |
| 10470.62 | 0.0173 | 1.2296 | 0.0005 | 6.466 | 0.102 |
| 10971.89 | 0.0165 | 1.2331 | 0.0035 | 7.294 | 0.829 |
| 11472.29 | 0.0158 | 1.2367 | 0.0036 | 8.176 | 0.882 |
| 11970.91 | 0.0151 | 1.2410 | 0.0043 | 9.291 | 1.114 |
| 12570.40 | 0.0144 | 1.2447 | 0.0038 | 10.314 | 1.023 |
| 13070.53 | 0.0138 | 1.2452 | 0.0005 | 10.450 | 0.136 |
| 13617.65 | 0.0133 | 1.2501 | 0.0049 | 11.889 | 1.440 |
| 13967.05 | 0.0129 | 1.2531 | 0.0030 | 12.809 | 0.920 |
| 14307.46 | 0.0126 | 1.2552 | 0.0021 | 13.455 | 0.646 |
| 14564.78 | 0.0124 | 1.2576 | 0.0024 | 14.223 | 0.768 |
| 14965.73 | 0.0121 | 1.2599 | 0.0023 | 14.988 | 0.765 |
| 15416.40 | 0.0117 | 1.2639 | 0.0040 | 16.335 | 1.347 |
| 15762.45 | 0.0115 | 1.2676 | 0.0036 | 17.591 | 1.256 |
| 16166.73 | 0.0112 | 1.2677 | 0.0001 | 17.630 | 0.040 |
| 16616.37 | 0.0109 | 1.2719 | 0.0042 | 19.150 | 1.520 |
| 16960.61 | 0.0107 | 1.2749 | 0.0030 | 20.256 | 1.106 |
| 17316.25 | 0.0104 | 1.2772 | 0.0024 | 21.148 | 0.892 |
| 17658.98 | 0.0102 | 1.2804 | 0.0032 | 22.385 | 1.237 |
| 18064.60 | 0.0100 | 1.2827 | 0.0023 | 23.299 | 0.914 |
| 18414.55 | 0.0098 | 1.2841 | 0.0014 | 23.866 | 0.567 |
| 18763.78 | 0.0096 | 1.2864 | 0.0023 | 24.796 | 0.930 |
| 19163.00 | 0.0094 | 1.2889 | 0.0025 | 25.837 | 1.041 |
| 19768.88 | 0.0091 | 1.2928 | 0.0039 | 27.536 | 1.699 |
| 20268.77 | 0.0089 | 1.2964 | 0.0036 | 29.119 | 1.583 |
| 20774.96 | 0.0087 | 1.3011 | 0.0047 | 31.231 | 2.112 |
| 21176.47 | 0.0085 | 1.3028 | 0.0017 | 32.042 | 0.812 |
| 21628.88 | 0.0084 | 1.3031 | 0.0003 | 32.196 | 0.153 |
| 22030.61 | 0.0082 | 1.3036 | 0.0005 | 32.444 | 0.248 |
| 22635.76 | 0.0080 | 1.3073 | 0.0036 | 34.232 | 1.788 |
| 23184.23 | 0.0078 | 1.3104 | 0.0032 | 35.834 | 1.601 |
| 23735.82 | 0.0076 | 1.3136 | 0.0032 | 37.485 | 1.652 |
| 24086.30 | 0.0075 | 1.3157 | 0.0021 | 38.614 | 1.129 |
| 24635.92 | 0.0073 | 1.3192 | 0.0035 | 40.477 | 1.863 |
| 25038.56 | 0.0072 | 1.3203 | 0.0011 | 41.100 | 0.622 |
| 25438.75 | 0.0071 | 1.3222 | 0.0018 | 42.129 | 1.030 |
| 25889.44 | 0.0070 | 1.3257 | 0.0035 | 44.102 | 1.973 |
| 26440.48 | 0.0068 | 1.3294 | 0.0037 | 46.255 | 2.152 |
| 26940.73 | 0.0067 | 1.3301 | 0.0007 | 46.691 | 0.436 |
| 27390.60 | 0.0066 | 1.3307 | 0.0006 | 47.033 | 0.342 |
| 27790.95 | 0.0065 | 1.3311 | 0.0004 | 47.295 | 0.262 |
| 28242.92 | 0.0064 | 1.3332 | 0.0020 | 48.564 | 1.269 |
| 28992.09 | 0.0062 | 1.3355 | 0.0023 | 50.026 | 1.462 |
| 29490.74 | 0.0061 | 1.3400 | 0.0045 | 52.952 | 2.927 |
| 29992.66 | 0.0060 | 1.3413 | 0.0013 | 53.798 | 0.846 |
| 30442.34 | 0.0059 | 1.3424 | 0.0011 | 54.535 | 0.736 |
| 30892.54 | 0.0059 | 1.3453 | 0.0029 | 56.483 | 1.948 |
| 31293.56 | 0.0058 | 1.3471 | 0.0019 | 57.773 | 1.291 |
| 31792.98 | 0.0057 | 1.3489 | 0.0018 | 59.027 | 1.254 |
| 32342.58 | 0.0056 | 1.3522 | 0.0033 | 61.337 | 2.310 |
| 32894.12 | 0.0055 | 1.3539 | 0.0018 | 62.605 | 1.267 |
| 33493.07 | 0.0054 | 1.3579 | 0.0040 | 65.504 | 2.900 |
| 33994.23 | 0.0053 | 1.3688 | 0.0109 | 73.617 | 8.113 |
| 34643.81 | 0.0052 | 1.3688 | 0.0000 | 73.617 | 0.000 |
| 35494.02 | 0.0051 | 1.3688 | 0.0000 | 73.617 | 0.000 |
| 36194.08 | 0.0050 | 1.3688 | 0.0000 | 73.617 | 0.000 |
| 36989.66 | 0.0049 | 1.3698 | 0.0010 | 74.409 | 0.793 |
| 37640.79 | 0.0048 | 1.3698 | 0.0000 | 74.409 | 0.000 |
| 38444.35 | 0.0047 | 1.3698 | 0.0000 | 74.409 | 0.000 |
| 39188.36 | 0.0046 | 1.3698 | 0.0000 | 74.423 | 0.014 |
| 39990.17 | 0.0045 | 1.3698 | 0.0001 | 74.469 | 0.047 |
| 40487.10 | 0.0045 | 1.3699 | 0.0001 | 74.528 | 0.059 |
| 40992.49 | 0.0044 | 1.3717 | 0.0018 | 76.191 | 1.663 |
| 42479.49 | 0.0043 | 1.3794 | 0.0077 | 83.312 | 7.121 |
| 43333.89 | 0.0042 | 1.3812 | 0.0018 | 84.987 | 1.675 |

TABLE 2-continued

| | | | | | |
|---|---|---|---|---|---|
| 43969.05 | 0.0041 | 1.3843 | 0.0031 | 88.013 | 3.027 |
| 44978.84 | 0.0040 | 1.3868 | 0.0025 | 90.425 | 2.411 |
| 46471.49 | 0.0039 | 1.3908 | 0.0040 | 94.492 | 4.067 |
| 47963.72 | 0.0038 | 1.3944 | 0.0035 | 98.174 | 3.683 |
| 49463.29 | 0.0037 | 1.3966 | 0.0022 | 100.551 | 2.377 |
| 50163.30 | 0.0036 | 1.3966 | 0.0000 | 100.551 | 0.000 |
| 52960.51 | 0.0034 | 1.4019 | 0.0053 | 106.631 | 6.079 |
| 54462.78 | 0.0033 | 1.4066 | 0.0047 | 112.167 | 5.537 |
| 55961.25 | 0.0032 | 1.4069 | 0.0003 | 112.540 | 0.372 |
| 57963.79 | 0.0031 | 1.4069 | 0.0000 | 112.540 | 0.000 |
| 59960.48 | 0.0030 | 1.4145 | 0.0076 | 122.459 | 9.919 |

The porous purification block geometry is desirably such that the ratio of the first transverse dimension to the second transverse dimension is between 1.2 and 3.5, more particularly between 1.2 and 2.5, more particularly between 1.2 and 2.3, more particularly between 1.2 and 1.9, more particularly between 1.3 and 1.5, even more particularly between 1.36 and 1.5. For example, using a cylindrical annular geometry as a nonlimiting example, the ratio for a porous purification block having an inside diameter of 0.75 inches and an outside diameter of 1 inch would be 1.33. The ratio for a similar block having an inside diameter of 1.1 inches and an outside diameter of 1.5 inches would be 1.36. The ratio for a similar block having an inside diameter of 3 inches and an outside diameter of 4.5 inches would be 1.5. A suitable length (longitudinal dimension) for a cylindrical annular geometry would be about 6 inches. However, other dimensions for the porous purification block may be used, provided that the ratio of transverse dimensions is within the ranges set forth above.

The porous purification block described herein can be used alone as the fluid purification media in a fluid purification apparatus by introducing the porous purification block into a suitable housing containing a suitable inlet and outlet manifold that distributes incoming water to be treated (for example) to the first longitudinal surface of the porous purification block. The water flows along this surface and radially inward, where it leaves the porous purification block at the second longitudinal surface. The fluid spaces around these two surfaces should be separated from each other and not be in fluid communication except through the material of the porous purification block, as is known in the art, so that the fluid is forced to pass through the porous purification block by radial flow. Alternatively, if desired, water can be introduced into the annular space inside the second longitudinal surface and forced to flow radially outward through the porous purification block, although this is not the normal commercial configuration.

In another embodiment, the porous purification block described above can be combined with a second fluid purification media to form a fluid purification system, as described herein. For example, a fibrous nonwoven fabric, desirably containing one or more active materials disposed thereon, can be combined with the porous purification block described above. Desirably, this fibrous nonwoven fabric can be disposed in the space defined by the longitudinal second surface. Suitable nonwoven fabric materials include those having structural fibers, e.g., microglass, polyolefin fibers (such as polyethylene or polypropylene), polyester, or other fibers suitable for formation into a nonwoven fabric. The nonwoven fabric can have one or more active materials disposed on, in, among, or between the fibers. The active materials can be evenly distributed across one or more dimensions of the fabric, or can be clumped together in one or more regions of higher concentration of active material.

Desirably, the active material can include particles or fibers of aluminum, alumina, aluminosilicate, titanium dioxide, zinc oxide, zirconium oxide and the like, and combinations thereof. Desirably, a mixture of aluminum fibers or particles (having an average particle size or fiber thickness ranging from 4-6 µm, with around 25% of the particles or fibers having a size below 4 µm), and 0.2-1% of titanium dioxide (P25, Degussa) or zinc oxide or both.

Examples of suitable nonwoven materials include those described in U.S. Pat. Nos. 6,838,005; 7,311,752; 7,390,343; and 7,601,262, the entire contents of each of which are incorporated herein by reference.

In an embodiment, the fibrous nonwoven fabric can contain micron-sized aluminum fibers or particles bonded to, or deposited on or among, microglass fibers to produce a nonwoven fabric having a pore size of approximately 2 microns, with the largest pores about seven microns. The large pore size results in a low pressure drop while also allowing access to submicron particles, rather than having them accumulate on the surface in a filter bed.

Although the pore size of the nonwoven fabric is 2 microns, it is functionally rated at 0.03 microns. The fabric is able to efficiently filter particles having sizes from 0.001 to 7 microns. The filters have high retention for micron size silica dust, bacteria, virus, DNA/RNA, tannin and latex spheres.

Fibers of active material containing aluminum (either in metallic form, as alumina, or as an aluminosilicate) that are, on average, two nanometers in diameter are produced in a wet process where aluminum powder is reacted in the chemical process of forming non-woven material. The aluminum fibers attach themselves to the glass fibers in the reaction and during the drying process. They are tens to hundreds of nanometers long and are heavily aggregated. Most of the measured surface area (300-500 m$^2$/g) is on the fibers' external surface.

Aggregates of fibers of active material can increase pressure drop, so they are controlled by limiting the ratio of aluminum to microglass. The result is a flow rate capacity tens to hundreds of times greater than membranes. For instance, a 1.5 millimeter thick aluminum-microglass fiber composite can sustain a flow velocity of 1.5 cm/sec (5.4 L/cm2/hr) at 0.7 bar. In water, zeta potential is developed very close to the surface of a solid, caused by the charge distribution on the surface. As compared to a pure microglass media that is electronegative (−35 mV), the microglass/aluminum mixture becomes highly electropositive when the aluminum exceeds 15 weight percent. It is then capable of adsorbing >6 LRV (log retention value) of MS2 virus (a bacteriophage). The preferred ratio of aluminum to microglass (0.6 µm) is 4:6. Beyond that ratio, aluminum fibers or particles can somewhat aggregate in the pores of the filter causing an increase in pressure drop. Additional fibers including cellulose and a polymeric fiber are added to increase flexibility and strength so that the media can be pleated. Zeta potential for an embodiment of nonwoven fabric described herein is given in Table 3 below.

TABLE 3

Zeta potential of nano alumina/microglass

| Nano alumina content, wt-% | Zeta potential, mV | ph |
|---|---|---|
| 0.79 | +53 | 7.18 |

Another example of a suitable material is sold under the trademark DISRUPTOR® (Ahlstrom). The nonwoven fabric can desirably have a thickness ranging from 0.2 to 1.5 mm, more particularly, about 0.8 mm, and can be folded into a series of pleats and inserted into the space defined by the longitudinal second surface. Desirably, the second fluid purification media does not add significantly to the overall pressure drop of the fluid purification system.

Yet another example of a nonwoven fibrous fabric for use herein is that made by dissolving Alcan hydrate aluminum H10 in a 50% solution of sodium hydroxide at a temperature of around 300° F. at high pressure. The dissolution is continued until a concentration of 8 lb Al per gallon of solution is obtained. This is diluted at a dilution ratio of 3:1 with 3% fumed $TiO_2$. The resulting mixture is added to a fiber glass slurry paper (e.g. the commercially available fiber glass slurry paper from Lydle). The resulting precipitate on the paper has particles having diameters in the range of 20 nm. Similar nonwoven fabrics can be made by dissolving Alusil™ (Selecto, Inc.) and following a similar process. Other aluminum powders that can be used in a similar process include high purity aluminum powders commercially available from ALCOA, including those having standard fine powder grades of ALCOA, including those having standard fine powder grades of 4 μm, 5 μm, 6 μm, 7 μm, and 9 μm, and standard coarse powder grades of 123, 101, 104, 120, 130, 1221, 12C, and 718, or combinations of these.

Figure 11:
FIG. 11 is an SEM micrograph of an embodiment of nonwoven fibrous fabric described herein.
Figure 12:
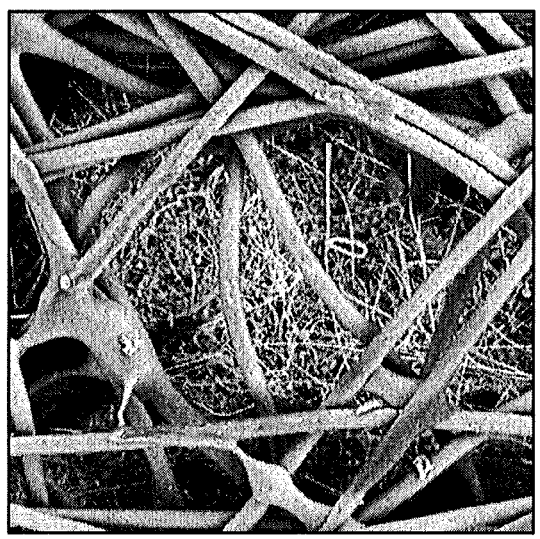
FIG. 12 is an SEM micrograph showing a magnified portion of the material of FIG. 11.
Figure 13:
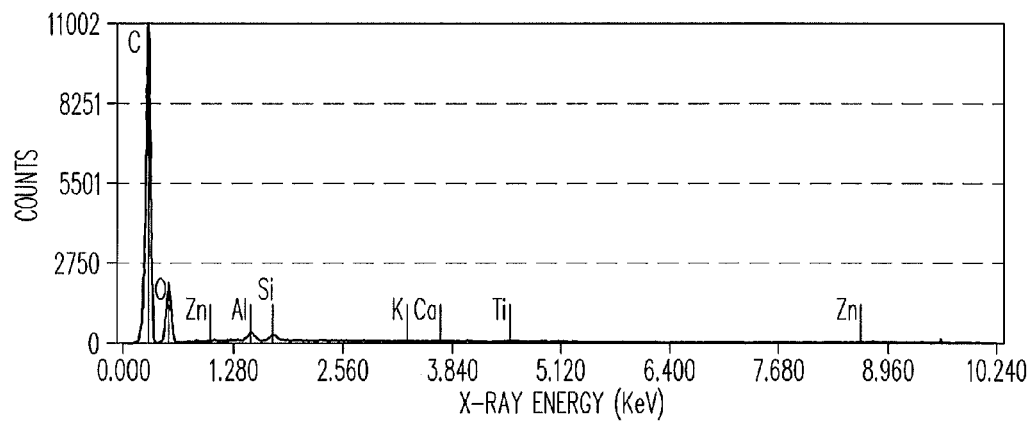
FIG. 13 is an EDX spectrum of the material of FIG. 11.

A section of sample of a nonwoven fibrous fabric having aluminosilicate particles and fibers on a microglass support fabric was subjected to EDX analysis in an analytical SEM operating at 20 keV. A backscattered electron SEM micrograph of the material is provided in FIG. 11, showing nonwoven fibers with clumps of other material present. FIG. 12 shows one of these clumps at higher magnification. FIG. 13 shows an EDX spectrum of the overall material, semiquartilative analysis shows the following elements, in wt %;

| | |
|---|---|
| C | 80 |
| O | 18 |
| Al | 0.5 |
| Si | 0.3 |
| S | bdl[1] |
| K | 0.1 |
| Ca | 0.1 |
| Ti | 0.1 |
| Zn | 0.3[2] |

[1] bdl = below detection level.
[2] May include sodium.

Figure 14:
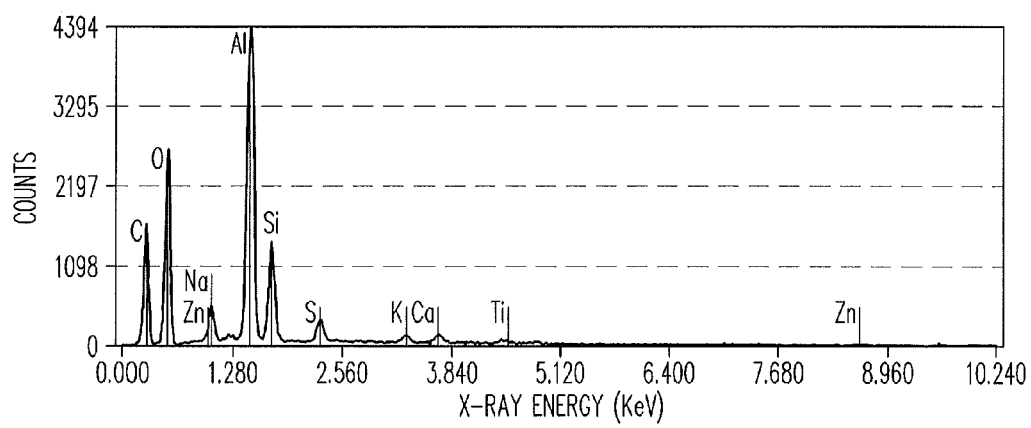
FIG. 14 is an EDX spectrum of a portion of the material shown in FIG. 12.

FIG. 14 shows an EDX spectrum for a clump region, showing a large amount of aluminum.

Desirably, each pleat of the nonwoven fabric is V-shaped, wherein one leg of the V has a length ranging from 6-18 mm, more particularly, from 7-10 mm. In general, the smaller pleats (which are therefore present in larger numbers inside the central opening of the porous purification block) provide decreased vibration when compared to larger, less numerous pleats.

In another embodiment, the fibrous nonwoven fabric can contain particles of the carbon fluid purification material described above. In a particular embodiment, these particles can be loaded onto the nonwoven fabric in an amount ranging between 10 and 30% by weight, more particularly around 15% by weight, based on the weight of the second fluid purification material. This material can be used as is (i.e., as the only fluid purification media in a fluid purification apparatus), or as part of a fluid purification system in combination with the porous purification block described above.

Without wishing to be bound by theory, it is believed that the pleating of the nonwoven fibrous fabric significantly affects the practical usability of the nonwoven material, especially in combination with a rigid porous purification block wherein the pleated fabric is deployed on the inside surface of the rigid annular porous purification block. In this regard, a flat sheet of Ahlstrom Disruptor 21944-344 material was wrapped around a rigid porous carbon block rated at 1 micron and another such block rated at 0.6 micron. The resulting filtration systems were challenged with water containing 123 000 counts of E. Coli per ml at an initial flow rate of 0.45 gal/min. After 20 L of water had passed the filter, the pressure drop was at 96%, with flow effectively stopping. By contrast, when the same specification rigid porous blocks are tested using pleated sheets of the same nonwoven material disposed inside the annual opening of the rigid porous block, at an initial flow rate of 0.56 gal/min of the same challenge water, a flow rate of 0.51 gal/min was maintained after 200 L of water had been processed.

In addition, a comparison of the pleated nonwoven fabric without the rigid, porous purification block indicated that the fabric was considerably less effective at removing cysts from water. A piece of pleated Ahstrom Disruptor material was subjected to cyst testing using NSF 53 as the test protocol. The pleated material alone only provided an 87% reduction (a reduction of 99.95% is considered acceptable). When the pleated material is disposed inside the annular opening of a rigid porous purification block as described herein, a reduction of 99.99% or better is obtained. Without wishing to be bound by theory, it is believed that the absence of the rigid porous purification block allows water impingement on the pleated fabric to separate and/or break the nonwoven fabric.

When a combination of the porous purification block and a pleated nonwoven fibrous fabric are used, it is generally desirable that the pleated nonwoven fibrous fabric be disposed inside the central opening of the annular tube formed by the porous purification block, as described herein. In such circumstances, it is desirable that the thickness of the annular shell formed by the porous purification block and the thickness of the nonwoven fibrous fabric be at least 4.5 to 1, more desirably, at least 7 to 1, even more desirably, at least 8.75 to 1. For example, it is desirable that, if the nonwoven fibrous fabric has a thickness of 1mm, the porous purification block have a thickness of at least 7 mm.

In order to further show the advantages of using the pleated nonwoven fibrous fabric having an active material disposed therein and disposed on the inner surface of an annular rigid porous purification block, the following tests were conducted:

Cyst testing NSF 53 life cyst with AC dust

EXPERIMENT 1

A pleated Ahlstrom Disruptor fabric having 37 pleats each having a 0.25 inch length was rolled into a cylinder having a 4.5 inch diameter and a 10 inch length was introduced into a radial flow housing. The system was subjected to challenge water according to NSF testing protocol 53 for live cyst with AC dust. At a flow rate of 5 GPM, the following results were obtained:

25% cycle-99.999% reduction
50% cycle-98% reduction
75% cycle-91% reduction

EXPERIMENT 2

The same pleated filter as described in Experiment 1 was inserted into the center of an annular rigid porous polymeric purification block having a thickness of 17 mm and made from high porosity, high molecular weight HDPE. The resulting assembly was inserted into a radial flow housing and subjected to the same NSF testing protocol. At a flow rate of 5 GPM the following results were obtained:
25% cycle-99.999% reduction
50% cycle-99.999% reduction
75% cycle-99.999% reduction

EXPERIMENT 3

The same pleated filter as described above but having 17 pleats each having a length of 12 mm was formed into a cylinder having a diameter of 1.5 inch and a length of 20 inches and introduced into a radial flow housing. The assembly was subjected to the same NSF testing protocol. At a flow rate of 2 GPM the following results were obtained:
25% cycle-99% reduction
50% cycle-97% reduction
75% cycle-86% reduction

EXPERIMENT 4

The same pleated filter as described in Experiment 3 was inserted into the center of an annular rigid porous polymeric purification block having a thickness of 16 mm and made from high porosity, high molecular weight HDPE. The thickness of the nonwoven fabric was measured to be 1.5 mm. The resulting assembly was inserted into a radial flow housing and subjected to the same NSF testing protocol. The following results were obtained at a flow rate of 3 GPM:
25% cycle-99.999%
50% cycle-99.999 %
75% cycle-99.999%

EXPERIMENT 5

The same filter arrangement as in Experiment 4 was used, except the porous purification block contained 61 wt % porous plastic and 30 wt % of a mixture of porous carbon with nanoparticulate zinc to make a rigid purification block having a thickness of 17 mm. The thickness of the nonwoven fabric was measured to be 1.5 mm. The assembly was introduced into a radial flow housing and subjected to the same NSF testing protocol as described above. At a flow rate of 5 GPM, the following results were obtained:
25% cycle-99.999%
50% cycle-99.999%
75% cycle-99.999%

EXPERIMENT 6

The same pleated filter as in Experiment 1 was introduced into the central opening of an annular rigid porous polypropylene blow molded block having a thickness of 19 mm thickness. The thickness of the nonwoven fabric was measured to be 1.5 mm. The assembly was placed in a radial flow housing and subjected to the same NSF test protocol as described above. At a flow rate of 3 GPM, the following results were obtained:
25% cycle-99.99%
50% cycle-99.99 %
75% cycle-99.99%

These results indicate that much improved filtration results are obtained when the nonwoven fabric filter is disposed within the annular opening of a rigid porous polymeric purification block, as described herein.

When a rigid porous purification block is configured as a cylindrical annular porous purification block having 1 inch outer diameter and ¾ inch inner diameter and 6 inches in length and incorporated with a pleated layer of nonwoven fabric containing microstructural glass fibers and micron-sized aluminum fibers disposed in clumps (DISRUPTOR®, Ahlstrom) having about 19 pleats, the resulting fluid purification system can be incorporated into a fluid purification apparatus and used to purify challenge water containing chlorine, E. coli, and virus particles. The purification system was able to remove 2 ppm chlorine, and attain 99.9999% E. coli reduction and 99.99% virus reduction for 1000 gallons of water flowing at 1500 $cm^3$/min and at 10 psi.

In order to provide a clearer understanding of the fluid purification materials and system described herein, they are described below with respect to the drawings, which are not intended to limit the scope of the appended claims. Unless indicated otherwise, similar structure in multiple figures is given the same reference numeral.

Figure 1B:
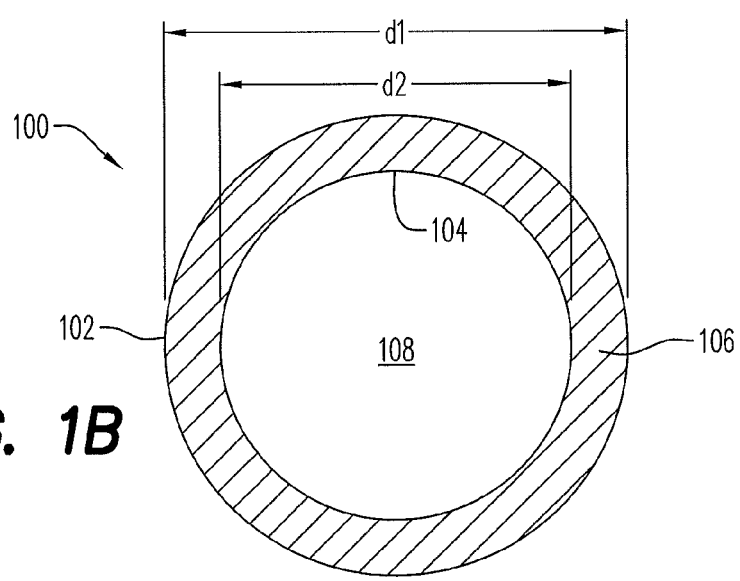
FIG. 1B is a schematic top view of the purification media of FIG. 1A.

FIGS. 1A and 1B provide schematic perspective and top views, respectively, of an embodiment of a cylindrical annular porous purification block 100 described herein. The porous purification block has a longitudinal first surface 102 and a longitudinal second surface 104 disposed inside the longitudinal first surface 102. Between these two surfaces is a porous solid material 106, which contains a fluid purification material, such as porous carbon, and a porous polymeric binder. The cylindrical annulus surrounds a central space 108, which can be used as a fluid inlet or outlet space (if the porous purification block is the only fluid purification media) or to hold additional fluid purification media therein. The longitudinal first surface has a first transverse dimension d1 and the longitudinal second surface has a second transverse dimension d2. Desirably, the ratio of d1/d2 is between 1.2 and 1.9, more particularly between 1.3 and 1.5, even more particularly between 1.36 and 1.5. As an exemplary embodiment, the length of the rigid porous purification block can be around 6 inches, the outer diameter can be around 1.5 inches, and the inner diameter can be around 1.0 inch.

Figure 2A:
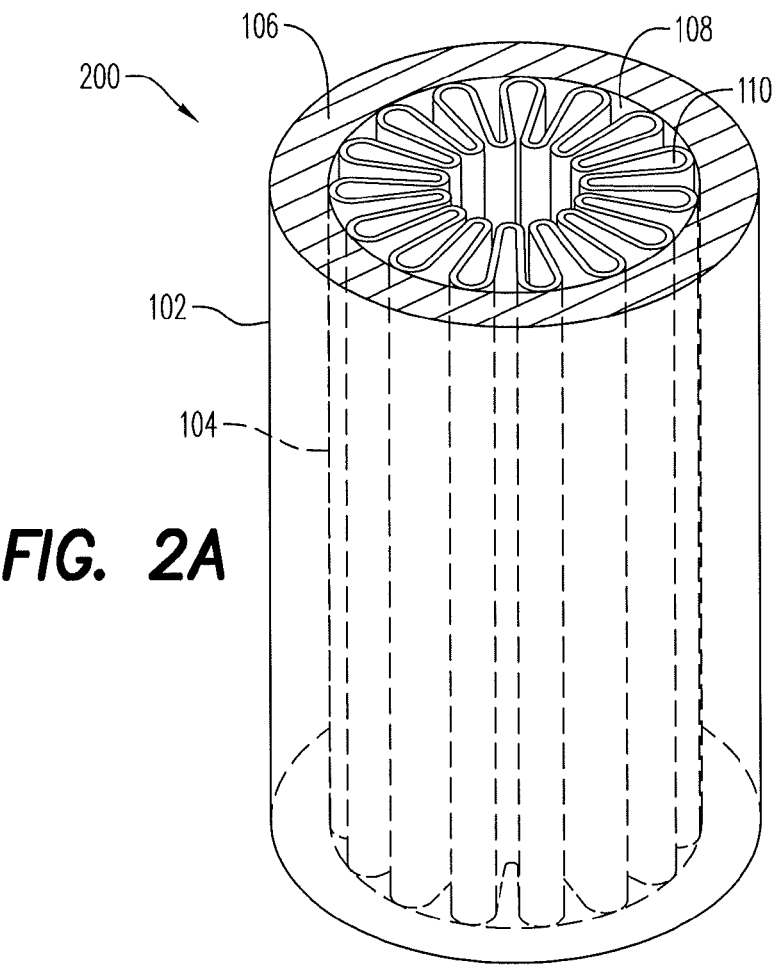
FIG. 2A is a schematic perspective view of another embodiment of a purification media and system described herein.
Figure 2B:
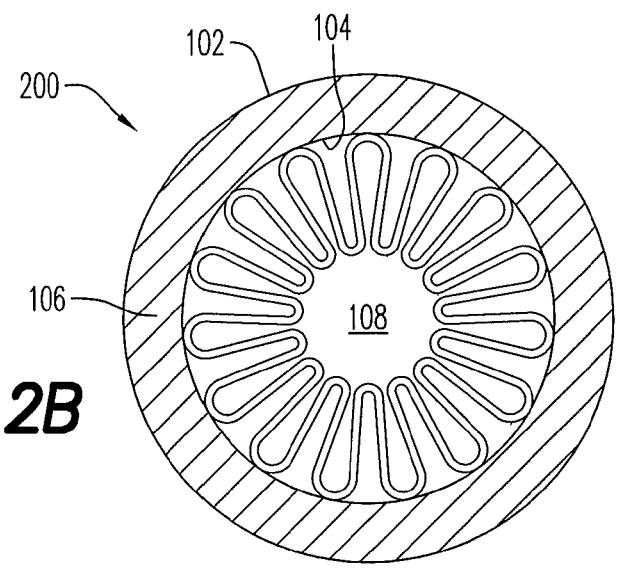
FIG. 2B is a schematic top view of the purification media of FIG. 2A.

FIGS. 2A and 2B provide schematic perspective and top views, respectively, of an embodiment of a fluid purification system 200 described herein. The fluid purification system 200 contains a porous purification block 100, and a pleated nonwoven fabric fluid purification medium 110 disposed in central space 108.

Figure 3:
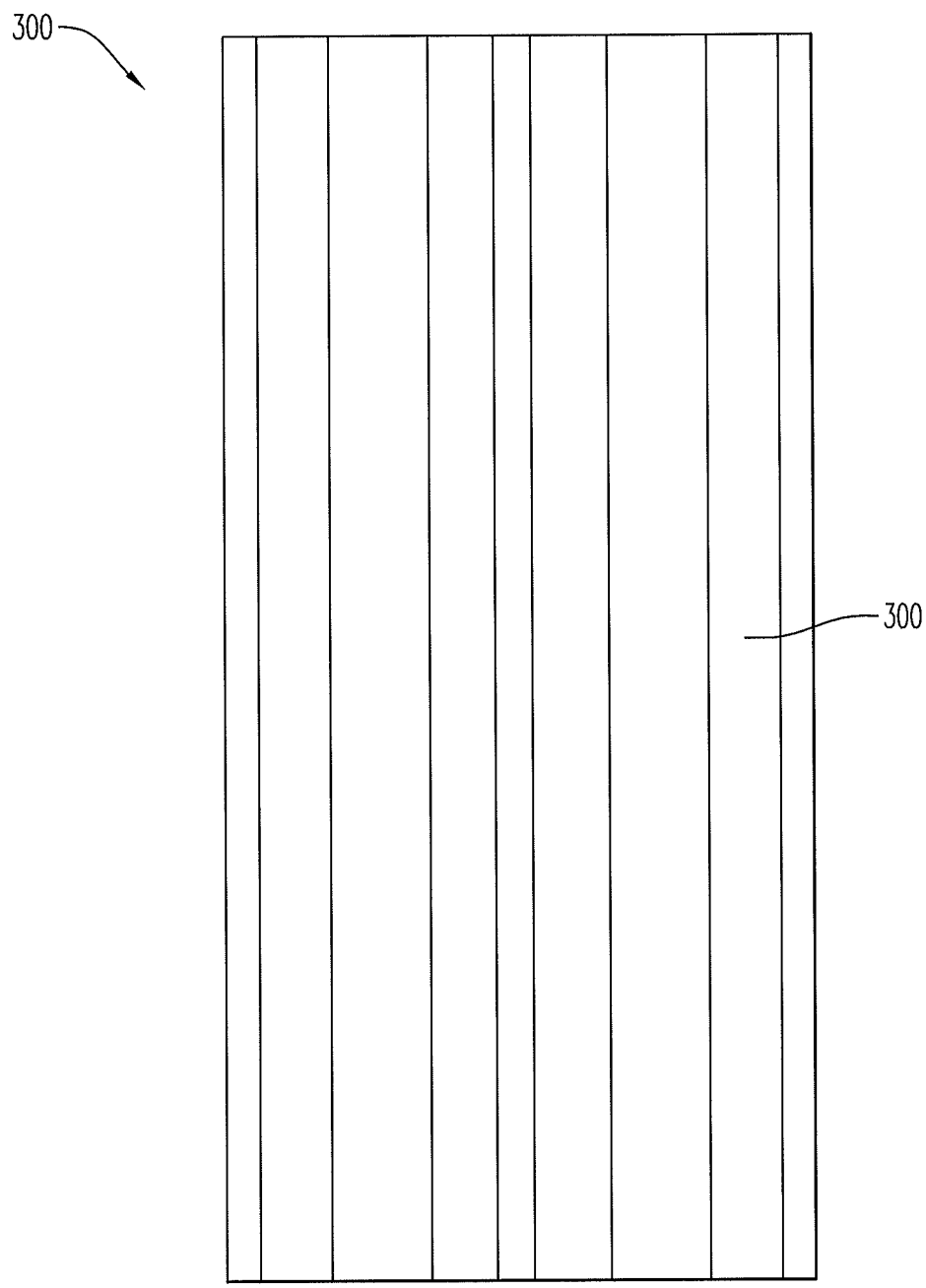
FIG. 3 is a schematic side view of another embodiment of a purification media and system described herein.

FIG. 3 is a schematic side view of another embodiment of a second fluid purification media disclosed herein, namely a nonwoven fabric 310 containing a fluid purification material (e.g., the porous carbon disclosed herein) within the nonwoven fabric.

In order to further illustrate the advantages of the fluid purification media disclosed herein, and in particular of the combination of porous purification block and nonwoven fabric (Ahlstrom Disruptor) forming the fluid purification system described herein, the following experiments were conducted. The filters were evaluated to determine on their ability to remove bacteria (E. Coli), and on their filtration capacity. In addition, the micron rating of each filter was evaluated using AC dust (0.1-5 micron) and laser counting.

In testing the flow rate characteristics, flow of 65° F. DI water having 100,000 count of bacteria (E. Coli) per cc was initiated through new filters, and the flow rate measured over the first minute. The results are given in Table 4 below. Flow was conducted at a water pressure of 12-14 psi.

TABLE 4

| No. | Filter | Flow rate cm³/min |
|---|---|---|
| 1 | KX MB filter 6 × 1.5 inch | 375 |
| 2 | Ceramic filter 6 × 2 in | 121 |
| 3 | High porosity carbon block (0.5 micron rated; 80% carbon, 20% UHDPE) | 236 |
| 4 | Carbon block (37.67 mm OD, 26 mm ID, 5.8 mm thickness) and pleated center core (1 mm thickness, pleating length 7 mm) of microglass fibers and aluminum-coating active material | 2560 |

In testing for bacterial reduction, water at 13 psi and having an average E. Coli count of 30,000 to 100,000 per cc was caused to flow through each of the filters in Table 1. The micron ratings of these filters is given below, in Table 5 as well as the flow results.

TABLE 5

| No. | Flow Results | Micron Rating |
|---|---|---|
| 1 | No water flow after 7 gallons | 0.1 |
| 2 | No water flow after 16 gallons | 0.01 |
| 3 | No water flow after 15 gallons | 0.1 |
| 4 | After 200 gallons, water flow rate was 1780 cm³/min with 99.9999 bacteria reduction | 1-2 |

In addition, further testing confirmed the advantages of filter no. 4 as compared to the individual components thereof (i.e. the porous carbon block and the fibrous, nonwoven fabric, considered separately). The porous carbon block (6×1.25 inches, 8 mm thick) containing 70% UHDPE polymer, 1% nano zinc, and 29% high porosity carbon (10-200 micron) provided reduction of E. Coli of 0.75 log, and a reduction of viruses of 1 log. When a block of the same porous carbon was combined with a pleated nonwoven fabric containing aluminum particles placed in its center opening Ahlstrom Disruptor, it reduced E. Coli by 99.99999% and reduced viruses by 99.99%. The pleated nonwoven fabric itself reduced E. Coli by 99.99% and reduced viruses by 99.9%.

The filtration system including the combination of porous carbon block and pleated nonwoven fabric containing an aluminum active material in the central opening of the carbon block, so that water passes first through a relatively thin carbon block and then through the pleated nonwoven fabric, provides unexpectedly high capacities and flow rates at low water pressures, such as those found in developing countries and emerging economies. Moreover, the filtration system provides unexpectedly high bacteria reduction when compared to the individual components thereof, as well as when compared to competing products, all of which have much smaller micron ratings. The filtration system is particularly suited for use in emerging economies and developing countries because it allows for a large volume of water to be processed, unlike competing products, which shut down in the presence of algae or organics in the water.

The filtration system disclosed herein also provides enhanced turbidity reduction when compared to other systems. For example, in turbidity testing done according to NSF 53 at 15 psi, the KX filter noted above was unable to provide flow when challenged with incoming water having a turbidity of 11 NTU. By contrast, the purification system described herein having a thin carbon block and a pleated nonwoven fabric reduced the turbidity from 11 NTU to 0 NTU while providing 1760 cm³ flow rate of efficient water.

The filtration system described herein can also be used to reduce chlorine present in the water being purified. The arrangement of the rigid porous purification block and the active material-containing nonwoven fibrous fabric disposed on an inner surface thereof can significantly reduce the amount of carbon needed in the purification block to reduce chlorine. For example, an annular cylindrical rigid porous purification block having a length of 6 inches, an outer diameter of 1.25 inches and an inner diameter of 1 inch was made from 70 wt % high molecular weigh high density polyethylene and 30 wt % hollow carbon having a particle size ranging from 10-160 micron. The total weight of the rigid porous block was 36 grams, and 8.78 grams of carbon was used. In the center of the annular block was inserted a pleated aluminum-containing nonwoven fibrous fabric (Ahlstrom Disruptor). The chlorine reduction ability of the filter was determined by subjecting the filter to challenge water containing 2.23 ppm at a flow rate of 0.5 GPM over a total capacity of 300 gallons. The resulting chlorine reduction after 300 gallons was measured to be 99%. When the test was repeated with a porous block made from coconut shell carbon, the chlorine reduction at 300 gallons was 23%.

Embodiments of the fluid purification media described herein can provide the bacterial reduction of a submicron rated filter while providing a pressure drop found with filters having a micron rating of higher than 1. For example, a new commercially available filter having a micron rating of 1.2 provides a pressure drop of 45%, but provide a reduction of only 67% of challenge bacteria. A new commercially available filter having a 0.45 micron rating provides an increased pressure drop (76%), but only a slightly increased reduction in bacteria (72% reduction). A new commercially available filter having a 0.1 micron rating provides an even larger pressure drop (99%) and achieves bacterial reduction of 99.99%. A new commercially available filter having a micron rating of 0.027 provides a pressure drop of 99.99% to achieve a bacteria reduction of 99.9999%. All of these tests were conducted according to NSF test protocol P231 at an inlet pressure of 60 psi. It is clear that existing commercially available filters achieve acceptable bacterial reduction only at very large pressure drops, rendering them unsuitable for low water pressure installations. Moreover, none of the tested commercially available filters provided any noticeable degree of scale control.

By contrast, the filtration system described herein has an overall micron rating of 2, yet provides only a 2% pressure drop while achieving a bacterial reduction of 99.9999% using the same test protocol. Because of this combination of low pressure drop and high bacterial reduction, the filtration system disclosed herein is ideally suited for use in low water pressure environments such as emerging economies and developing countries without highly developed water supply infrastructure. Moreover, the filtration system described herein provides scale control on the order of 98%.

As further indication of the bacteria-removing capabilities of the disclosed filtration system, the following testing of an embodiment of a filtration system disclosed herein was conducted. The testing was conducted according to NSP P231 at 15 psi inlet water. The rigid porous purification block was a cylindrical annular block having an outer diameter of 1.45 inch, an inner diameter of 1 inch, a length of 6 inches, and contained 28% porous carbon, 70% HDPE, and 2% nanoparticulate zinc oxide. The nonwoven fibrous fabric was a microglass nonwoven fabric having aluminum or aluminosilicate particles disposed thereon, and having a 1 mm thickness with 23 pleats, disposed in the central opening of the rigid porous purification block.

| EXPERIMENT A | |
|---|---|
| Cycle: | 10 min ON and 10 min OFF |

-continued

EXPERIMENT A

| | | |
|---|---|---|
| Inlet Pressure: | 15 psi | |
| Flow: | 0.3 GPM (1.13 L/min) | |
| Sampling Points: | Effluent: every cycle at middle | Influent: 1st cycle and last cycle |
| First Run: | 50 liters (actual run 16 gallons of 10,250 counts/mL | 100% reduction (5 samples) |
| Second Run: | 75 liters DI city water 2 hrs 10 min | 100% reduction (6 samples) |
| Third Run: | 10 liters (actual 4 gallons of 11,400 counts E. coli/mL) | 100% reduction (1 sample) |
| Fourth Run: | 50 liters (actual 16 gallons of E. coli at 11,000 counts/mL) | 100% reduction (5 samples) |

EXPERIMENT B

Bacteria Filter E. Coli Results

| | Influent (cfu/100 mL) | Effluent (cfu/100 mL) | Log Reduction |
|---|---|---|---|
| First Cycle | $3.7 \times 10^7$ | <1.0 | >7.6 |
| 50 L | $2.7 \times 10^7$ | <1.0 | >7.4 |
| 100 L | $5.5 \times 10^7$ | <1.0 | >7.7 |

Bacteria Filter MS2 Phage Results

| | Influent (pfu/100 mL) | Effluent (pfu/100 mL) | Log Reduction |
|---|---|---|---|
| First Cycle | $9.1 \times 10^5$ | <1.0 | >5.9 |
| 50 L | $8.9 \times 10^5$ | <1.0 | >5.9 |
| 100 L | $1.7 \times 10^6$ | <1.0 | >6.2 |

EXPERIMENT C

| | | |
|---|---|---|
| Inlet: | 30 NTU | |
| Inlet Pressure: | 15 PSI | |
| Flow at sample point: | 0.3 GPM | |
| Bacteria Reduction Cycle | with AC dust | 100% reduction |
| Bacteria Reduction Cycle | with AC dust | 100% reduction |

Total water run with bacteria 260 liters
Conclusion: Filter with 30 NTU at cycle point reduced bacteria with AC dust 100% per NSF protocol P 231

EXPERIMENT D

| | | | |
|---|---|---|---|
| Cycle: | 10 min ON and 10 min OFF | | Samples taken at 5 min |
| Inlet | 15 psi | | |
| Flow: | 0.3 GPM (1.13 L/min) | | |
| Sampling Points: | Effluent: every cycle at middle | | |

Results

| | | | |
|---|---|---|---|
| First Run: | 16 gallons of DI water approx. 10,000 counts/mL | E coli concentration 15,000 cfu/mL | 100% reduction (2 samples) |
| Second Run: | 10 gallons of DI water dust 30 NTU no E. coli | E coli concentration none | |
| Third Run: | 4 gallons of DI water approx. 100,000 counts/mL | E coli concentration 170,000 cfu/mL | 100% reduction (2 samples) |
| Fourth Run: | 16 gallons of DI water approx. 10,000 counts/mL | E coli concentration 5050 | 100% reduction (2 samples) |

Figure 9:
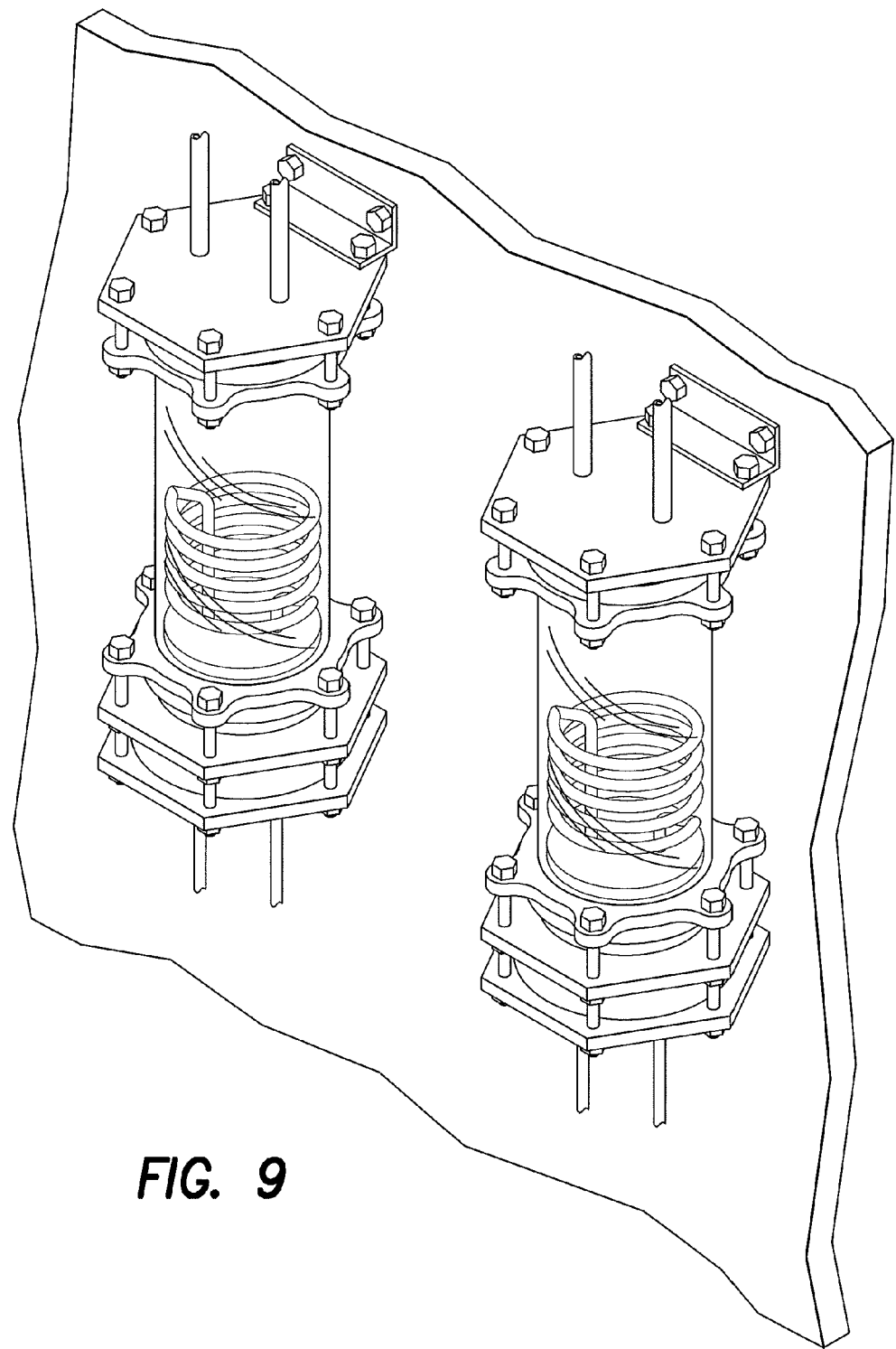
FIG. 9 is a photograph of a test rig for evaluating the ability of embodiments of the disclosed filtration system to remove scale from water.
Figure 10:
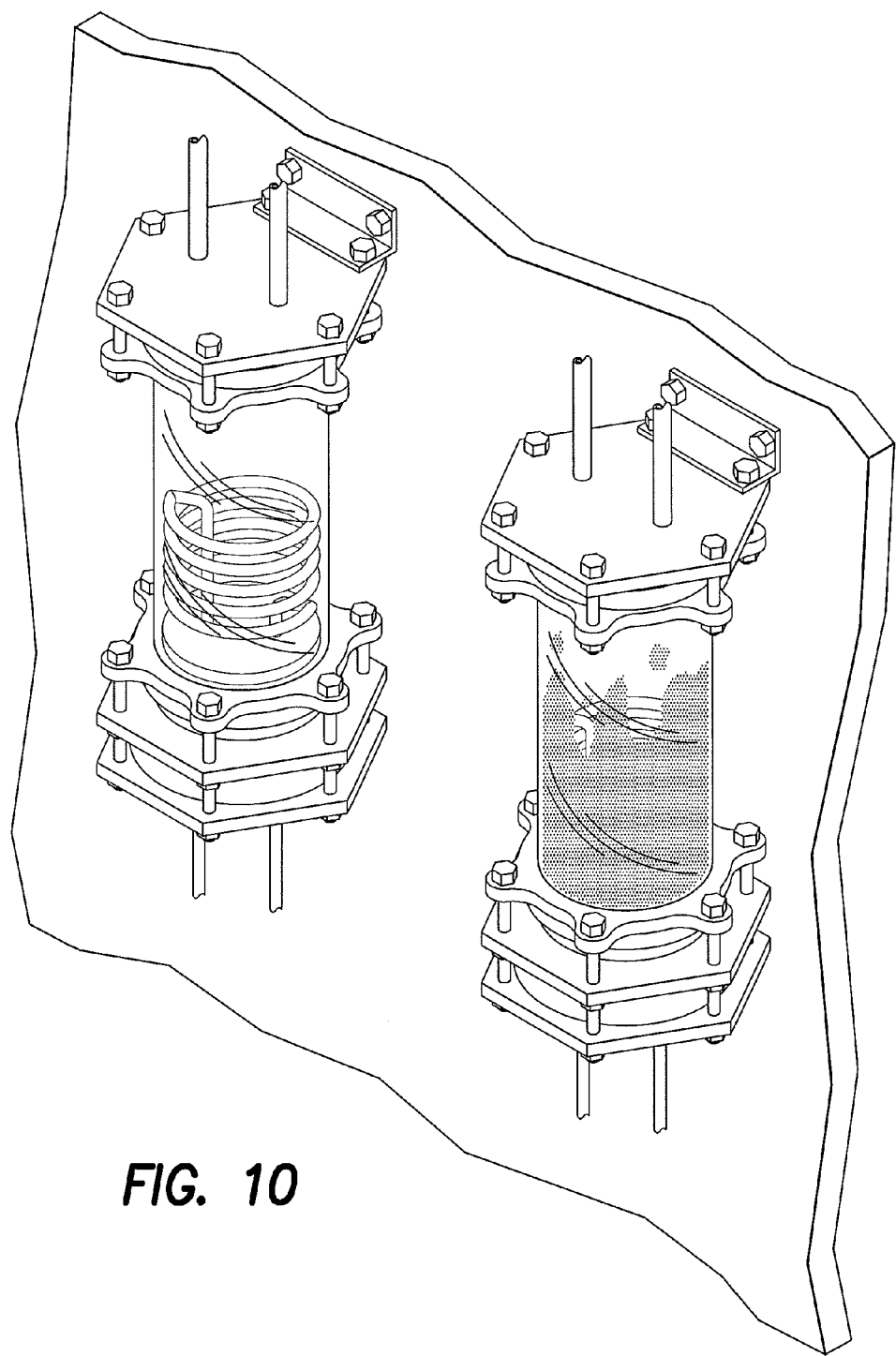
FIG. 10 is a photograph of the test rig showing scale buildup in the unfiltered side of the testing.

With respect to evaluating scale control, water having 25 grains hardness was passed through the heating coil rig shown in FIG. 9. The testing was conducted according to test protocol DVGW 512, and the results are shown in FIG. 10. The unfiltered water showed significant scale build up, as is visible on the right side of the test rig and as indicated below. The filtered water showed almost no scale build up, as indicated on the left side of the test rig and indicated below:

| Test Results at 100° C. 25 grains hardness | Untreated | Filtered Water |
|---|---|---|
| Heating Coil | 1.221 | 0.01 |
| Glass Wall | 0.936 | 0.06 |
| Floor Base | 0.198 | 0.03 |
| Total | 2.355 | 0.10 |

Additional testing in 30 grain hardness water over 1200 liters gave the following results

| Test Results at 100° C. 25 grains hardness | Untreated | Filtered Water |
|---|---|---|
| Heating Coil | 3.316 | 0.04 |
| Glass Wall | 2.171 | 0.03 |
| Floor Base | 0.867 | 0.004 |
| Total | 6.354 | 0.074 |

The scale control provided by the filtration system and apparatus disclosed herein, combined with the efficiency of removing microorganisms from water, makes the fluid purification system suitable for incorporation into a wide variety of appliances that benefit from scale control (e.g., automatic dishwashers, laundry washing machines) or from such microbial control (e.g., refrigerators, ice makers). The fluid purification system described herein can be incorporated into a suitable housing, which is plumbed into the water supply line of the appliance.

In yet another embodiment, the filtration system described above (having a first fluid purification media containing a first rigid porous purification block and a second fluid purification media comprising a fibrous nonwoven fabric) can be combined with additional fluid purification media. An exemplary embodiment of such a system comprises a fluid purification system, comprising: a first fluid purification media comprising a first rigid porous purification block, comprising: a longitudinal first surface; a longitudinal second surface disposed inside the longitudinal first surface; and a porous high density polymer disposed between the longitudinal first surface and the longitudinal second surface; a second fluid purification media, comprising a fibrous, nonwoven fabric disposed adjacent inside to the first surface of the first fluid purification media, the second surface of the first purification media, or both; a third fluid purification media comprising a second rigid porous purification block having a longitudinal outer surface and a longitudinal inner surface, wherein the longitudinal inner surface is disposed transversely outside the longitudinal first surface of the first fluid purification media and defining a transverse gap therebetween, or wherein the longitudinal outer surface is disposed inside the longitudinal second surface of the first fluid purification media, and defining a transverse gap therebetween; a fourth fluid purification media comprising particles of a fluid purification material disposed in the transverse gap.

In particular is disclosed an embodiment of the fluid purification system described above, wherein the longitudinal inner surface of the second rigid porous purification block of the third purification media is disposed transversely outside the longitudinal first surface of the first rigid porous purification block of the first fluid purification media, wherein the second fluid purification media is disposed inside and adjacent to the longitudinal second surface of the first rigid porous purification block of the first fluid purification media, and wherein the fourth fluid purification media is disposed in the transverse gap between said longitudinal inner surface of the first rigid porous purification block and said longitudinal first surface of said second rigid porous purification block.

More particularly, an embodiment is disclosed of the fluid purification system described above, wherein the longitudinal outer surface of the second rigid porous purification block of the third fluid purification media is disposed transversely inside the longitudinal second surface of the first rigid porous purification block of the first fluid purification media, and wherein the second fluid purification media and the fourth fluid purification media are disposed in the transverse gap between said longitudinal second surface and said longitudinal outer surface.

More particularly, an embodiment is disclosed of the fluid purification system described above and shown in FIG. 22, wherein the second purification media 110 is disposed adjacent to the longitudinal second surface of the first rigid porous purification block 100 of the first fluid purification media, and wherein the fourth fluid purification media 2202 is disposed between the second purification media and the longitudinal outer surface of the second rigid porous purification block of the third fluid purification media 2204.

In one particular embodiment a filter cartridge having an overall diameter of 2.5 inches and a length of 6 inches was constructed of (1) a porous HDPE outer shell, (2) a carbon powder having a nominal particle size distribution of 80×325 mesh disposed inside the porous HDPE outer shell, (3) a second porous shell disposed inside the first porous HDPE shell, and forming a transverse space containing the carbon powder, and (4) a pleated nonwoven sheet (i.e. Ahlstrom Disruptor) disposed in the center of the second porous shell.

The filter cartridge provides a flow of 0.5 gal/min at an inlet pressure of 20 psi while reducing chloramines in the water. At an inlet pressure of 10 psi, a flow of 1400 cm$^3$/min was obtained. Chloramine reduction of 98% was obtained for 300-400 gallons of water using NSF test protocol 42. Turbidity was tested using NSF test protocol 53. Chlorine reduction of 99% was obtained for 2000 gallons of water.

Figure 22:
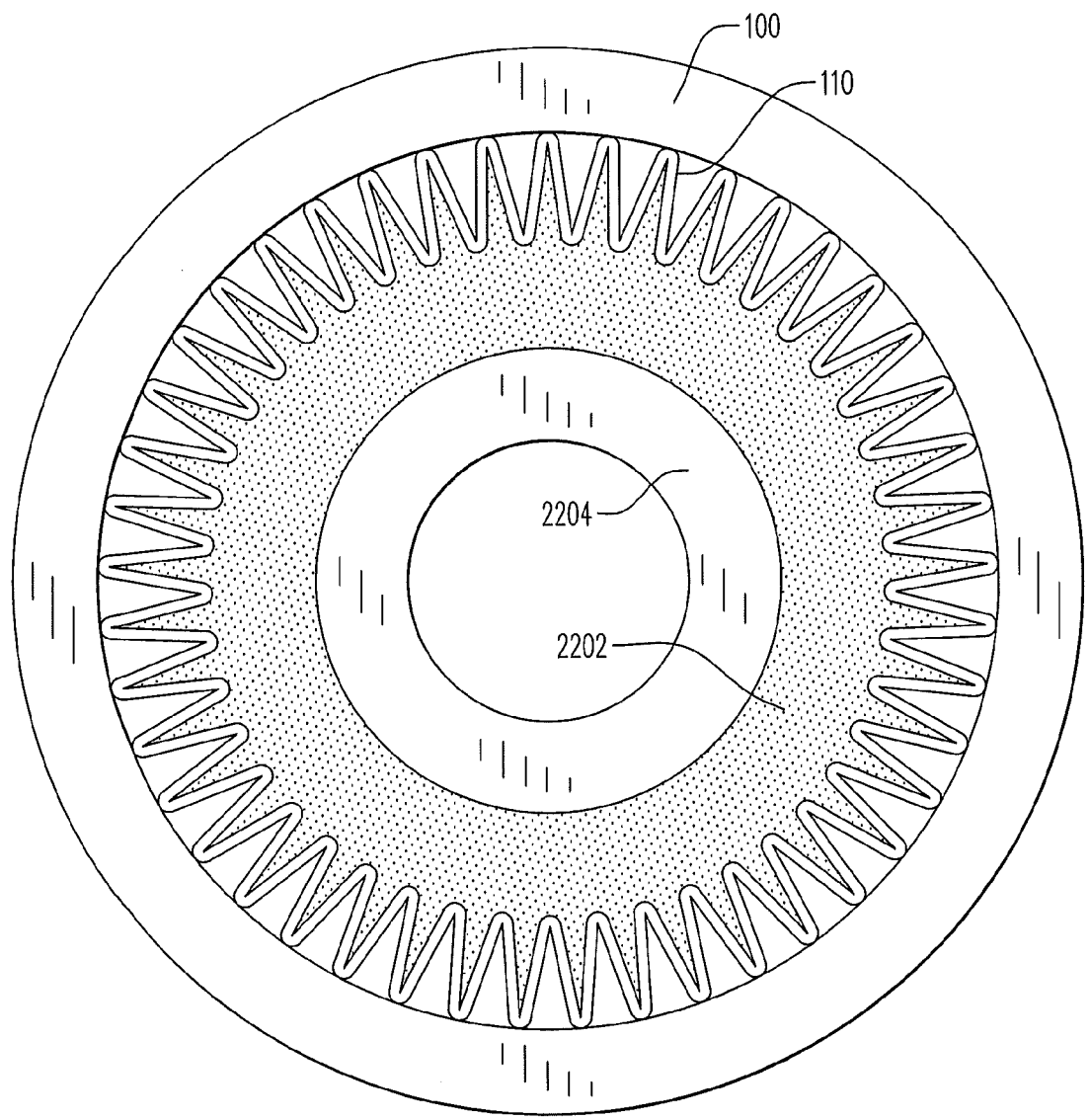
FIG. 22 is a top view of an embodiment of a purification system described herein.

In another particular embodiment, a filter cartridge having an outer diameter of 4.5 inches and a length of 20 inches was constructed of (1) a porous outer shell of HDPE having an outer diameter of 20 inches, (2) a pleated Ahlstrom Disruptor fabric disposed inside the porous outer shell, (3) a carbon powder having a nominal particle size distributor of 80×325 mesh (50×200 mesh can also be used) disposed inside the fabric, and (4) a porous HDPE tube disposed inside the fabric, and turning a transverse gap within which the carbon powder is disposed as shown in FIG. 22.

The filter cartridge provides a flow rate of 2.0 gpm at an inlet pressure of 10 psi, a flow rate of 2.7 gpm at 15 psi, a flow rate of 3.5 gpm at 20 psi, and a flow rate of 5.62 gpm at 30 psi. At flow rates of 5 gpm, bacteria reduction of 99.999999% was obtained, VOC reduction of 96% was obtained, and cyst reduction of 99.999999% was obtained (using NSF test protocol 53).

Figure 23:
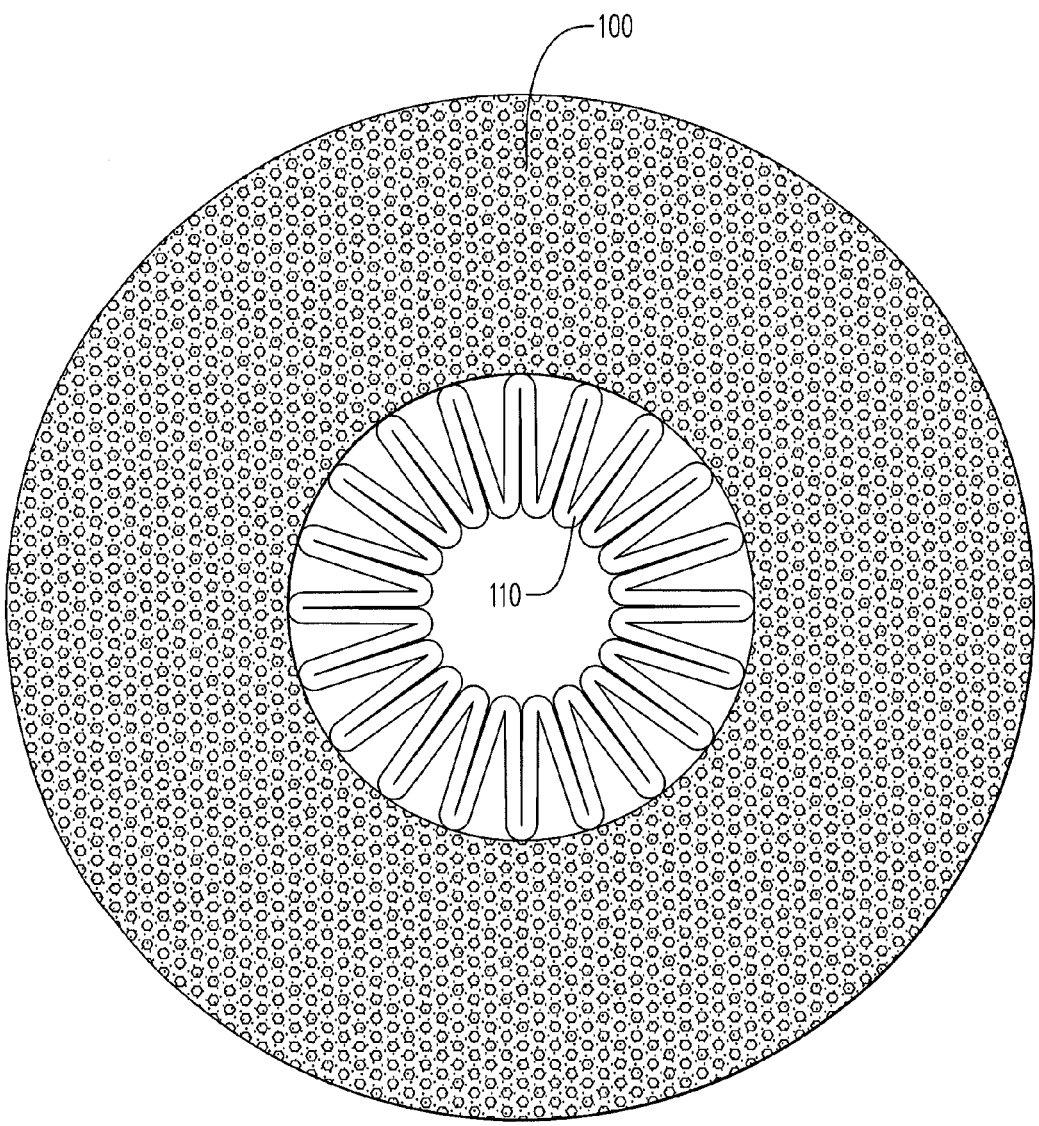
FIG. 23 is a top view of an embodiment of a purification system described herein.

In another particular embodiment illustrated in FIG. 23 a rigid porous purification block of molded HDPE containing alusilzn and having an outer diameter of 2.5 in., an inner diameter of 1.112 in.; and a length of 6 in was combined with an Ahlstrom Disruptor fabric pleated filter resulting filter cartridge provided a flow of 1800 cc/min at 10 psi, a flow of 1500 cc/min at 15 psi, and a flow of 1890 cc/min at 30 psi. A bacteria and virus reduction of 99.999999% was obtained.

Figure 24:
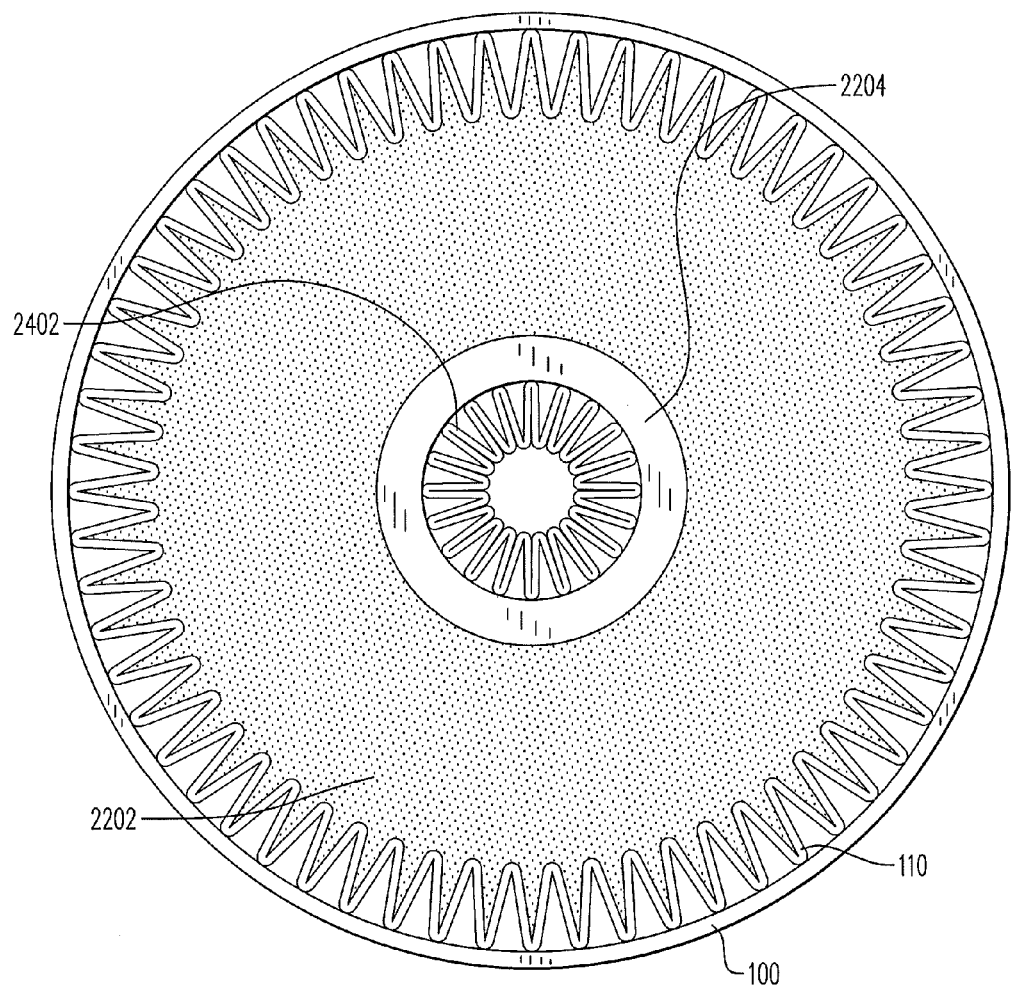
FIG. 24 is a top view of an embodiment of a particular system described herein.

FIG. 24 is a top view of another embodiment of fluid purification system described herein. This system is similar to the embodiment shown in FIG. 22, but contains a fifth fluid purification media, which is a second fibrous nonwoven fabric 2402 disposed inside the longitudinal inner surface of the second rigid porous purification block.

Figure 25:
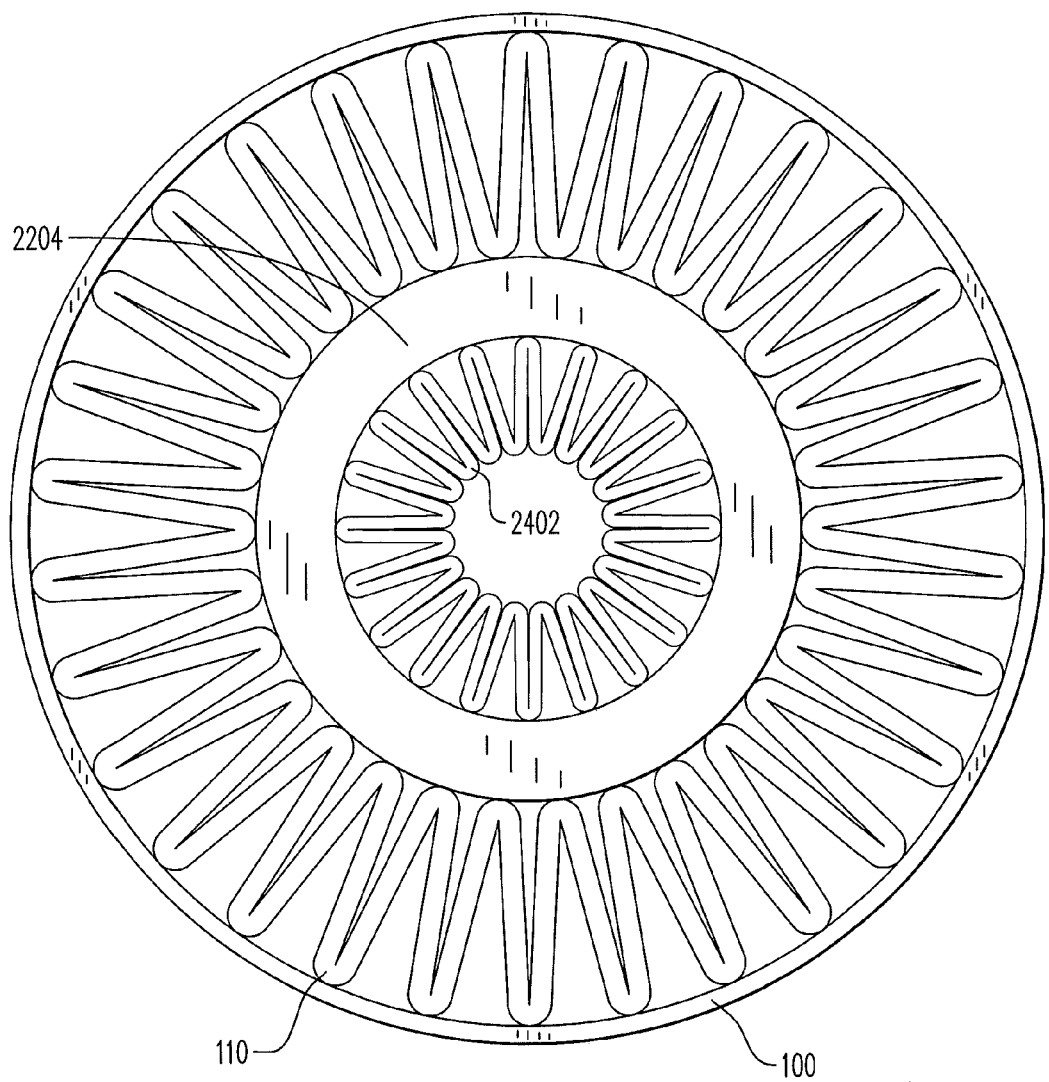
FIG. 25 is a top view of an embodiment of a particular system described herein.

FIG. 25 is a top view of another embodiment of fluid purification system described herein. This system is similar to that shown in FIG. 24, but does not contain the fourth fluid purification media 2202.

The fifth fluid purification material and the second fluid purification material may be the same fibrous nonwoven fabric, or may be different with regard to the material forming the structural fibers, any materials impregnated or deposited thereon, the number or size of pleats, etc.

Figure 26:
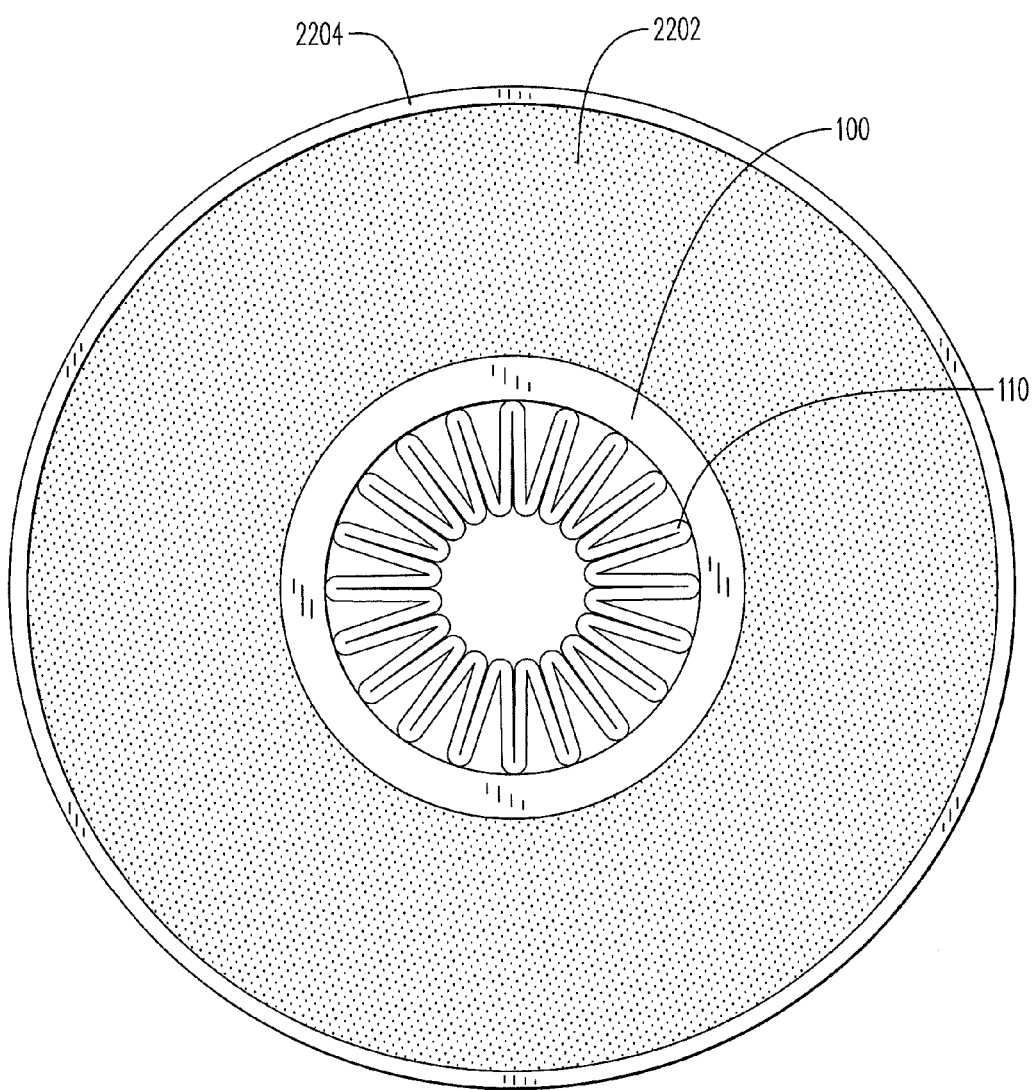
FIG. 26 is a top view of an embodiment of a particular system described herein.

FIG. 26 is a top view of another embodiment of fluid purification system described herein. This system has the first and second purification media (100, 110, respectively) disposed inside the third purification media 2204, with the second purification media 110 disposed inside the first purification media 100. Between the longitudinal first surface of the first purification media 100 and the longitudinal inner surface of the third purification media 2204 is disposed fourth purification media 2202.

The system of FIG. 26 was tested for *E. coli* and MS2 phage removal. A filtration unit containing a filtration system shown in FIG. 26 was disposed on a test rig and water at a flow rate of 1.5 L/min was flowed through the system with a dynamic pressure of 16 psig. The system was tested to a 100 L capacity on a 20 minute cycle, 50% on and 50% off, with water type GTW 1 (pH 8.03, chlorine 0.02 mg/L, turbidity 0.15 NTU, TDS 145 mg/L) at 18.3° C. During the sixth cycle, the flow rate of the system decreased to 0.79 L/min. The unit was stopped and allowed to run continuously until the final challenge point at 100 L. Challenges with MS2 phage and *E.coli* occurred during the first cycle, at a point near 50 L capacity, and at the end of the 100 L capacity. The challenge organisms were added to a volume of test water and injected into the flow stream at a rate to provide a concentration of $\geq 10^7$ pfu/L of MS2 phage and $\geq 10^7$ cfu/100 mL of *E. coli*.

Samples were assayed using the of Adams (1959) double layer agar method for MS2. Appropriate dilutions were made of the influent samples. Effluent samples were assayed in duplicate 1 mL and 0.1 mL samples. Plates were incubated at 35° C. for 24 hours and plaques were counted following incubation.

Samples were assayed for *E. coli* on mFC agar by the membrane filtration method (SM 9222). For influent samples, appropriate dilutions were made to account for the anticipated concentration. Effluent samples were assayed in triplicate 100 mL samples. Plates were incubated at 44.5° C.±0.2° C. for 24 hours, and the resulting colonies were counted. The results obtained are given below:

*E. coli*

|  | Influent (cfu/100 mL) | Effluent (cfu/100 mL) | Log Reduction |
| --- | --- | --- | --- |
| First Cycle | $3.7 \times 10^7$ | <1.0 | >7.6 |
| 50 L | $2.7 \times 10^7$ | <1.0 | >7.4 |
| 100 L | $5.5 \times 10^7$ | <1.0 | >7.7 |

MS2 Phage

|  | Influent (pfu/mL) | Effluent (pfu/mL) | Log Reduction |
| --- | --- | --- | --- |
| First Cycle | $9.1 \times 10^5$ | <1.0 | >5.9 |
| 50 L | $8.9 \times 10^5$ | <1.0 | >5.9 |
| 100 L | $1.7 \times 10^5$ | <1.0 | >6.2 |

The invention having been thus described by reference to certain specific embodiments and examples, it will be understood that these specific embodiments and examples are illustrative, and not intended to limit the scope of the appended claims.

What is claimed is:

1. A fluid purification system, comprising:
   a first fluid purification media comprising a first rigid porous purification block, comprising:
     a longitudinal first surface;
     a longitudinal second surface disposed inside the longitudinal first surface; and
     a porous high density polymer disposed between the longitudinal first surface and the longitudinal second surface;
   a second fluid purification media, comprising a pleated, fibrous, nonwoven fabric disposed inside the first surface of the first fluid purification media, the second surface of the first purification media, or both wherein the fibrous nonwoven fabric of the second fluid purification media is folded to form a plurality of pleats, and comprising an active material disposed on, among, or in the pleated, fibrous, nonwoven fabric;
   a third fluid purification media comprising a second rigid porous purification block having a longitudinal outer surface and a longitudinal inner surface, wherein the longitudinal inner surface is disposed transversely outside the longitudinal first surface of the first fluid purification media and defining a transverse gap therebetween, or wherein the longitudinal outer surface is disposed inside the longitudinal second surface of the first fluid purification media, and defining a transverse gap therebetween.

2. The fluid purification system according to claim 1, further comprising a fourth fluid purification media comprising particles of a fluid purification material disposed in the transverse gap.

3. The fluid purification system of claim 2, wherein the longitudinal inner surface of the second rigid porous purification block of the third purification media is disposed transversely outside the longitudinal first surface of the first rigid porous purification block of the first fluid purification media, wherein the second fluid purification media is disposed inside and adjacent to the longitudinal second surface of the first rigid porous purification block of the first fluid purification media, and wherein the fourth fluid purification media is disposed in the transverse gap between said longitudinal inner surface of the first rigid porous purification block and said longitudinal first surface of said second rigid porous purification block.

4. The fluid purification system of claim 2, wherein the longitudinal outer surface of the second rigid porous purification block of the third fluid purification media is disposed transversely inside the longitudinal second surface of the first rigid porous purification block of the first fluid purification media, and wherein the second fluid purification media and the fourth fluid purification media are disposed in the transverse gap between said longitudinal second surface and said longitudinal outer surface.

5. The fluid purification system of claim 3, wherein the second fluid purification media is disposed adjacent to the longitudinal second surface of the first rigid porous purification block of the first fluid purification media, and wherein the fourth fluid purification media is disposed between the second purification media and the longitudinal outer surface of the second rigid porous purification block of the third fluid purification media.

6. The fluid purification system of claim 5, further comprising a fifth fluid purification media comprising a second fibrous, nonwoven fabric disposed inside the longitudinal inner surface of the second rigid porous purification block.

7. The fluid purification system of claim 1, further comprising a fifth fluid purification media comprising a second fibrous, nonwoven fabric disposed inside the longitudinal inner surface of the second rigid porous purification block.

8. The fluid purification system of claim 1, wherein said fluid purification material comprises carbon particles having a porosity of 50% to 90%.

9. The fluid purification system of claim 1, wherein the first rigid porous purification block has an average pore diameter that ranges between 2,000 and 60,000 Å.

10. The fluid purification system of claim 1, wherein:
    the longitudinal first surface is an outer surface having a first transverse dimension;
    the longitudinal second surface is an inner surface having a second transverse dimension; and
    the ratio of the first transverse dimension to the second transverse dimension is in the range of 1.2 to 1.9, and the difference between the first transverse dimension and the second transverse dimension is the thickness of the rigid porous purification block.

11. The fluid purification system of claim 10, wherein:
    the ratio of the first transverse dimension to the second transverse dimension is in the range of 1.3 to 1.5.

12. The fluid purification system of claim 11, wherein:
    the ratio of the first transverse dimension to the second transverse dimension is in the range of 1.36 to 1.5.

13. The fluid purification system of claim 10, wherein the rigid porous purification block is in the form of an cylindrical annulus, and wherein the first transverse dimension is an outer diameter and the second transverse dimension is an inner diameter of the annulus.

14. The fluid purification system of claim 1, wherein the porous high density polymer comprises a high density polyethylene (HDPE).

15. The fluid purification system of claim 1, wherein the porous high density polymer comprises polyethylene.

16. The fluid purification system of claim 15, wherein the porous high density polymer is blow molded.

17. The fluid purification system of claim 1, wherein the porous high density polymer comprises a void volume of 30-70 volume %.

18. The fluid purification system of claim 17, wherein the porous high density polymer has a void volume of 40%.

19. The fluid purification system of claim 1, wherein the porous high density polymer comprises ultra high molecular weight polyethylene.

20. The fluid purification system of claim 1, wherein the rigid porous purification block comprises polymeric materials having a micron rating of 10-150.

21. The fluid purification system of claim 1, wherein the porous high density polymer is formed from particles of high density polymer having an average particle size ranging between 10 and 50 µm.

22. The fluid purification system of claim 1, wherein the first fluid purification media comprises carbon particles present in an amount ranging between 10 and 30% by weight, based on the total weight of the first rigid porous purification block.

23. The fluid purification system of claim 1, wherein the first fluid purification media comprises a fluid purification material present in an amount ranging between 15 and 30% by weight, based on the total weight of the rigid porous purification block.

24. The fluid purification system of claim 1, wherein the porous high density polymer is present in an amount ranging between 65 and 90% by weight, based on the total weight of the first rigid porous purification block.

25. The fluid purification system of claim 1, wherein the porous high density polymer is present in an amount ranging between 70 and 90% by weight, based on the total weight of the first rigid porous purification block.

26. The fluid purification system of claim 1, wherein the first rigid porous purification block comprises nanoparticulate zinc oxide.

27. The fluid purification system of claim 26, wherein the nanoparticulate zinc oxide is present in an amount ranging between 0.01 and 0.1% by weight, based upon the total weight of the first rigid porous purification block.

28. The fluid purification system of claim 27, wherein the nanoparticulate zinc oxide is present in an amount of about 0.06% by weight, based upon the total weight of the rigid porous purification block.

29. The fluid purification system of claim 1, wherein the first rigid porous purification block further comprises alumina nanofibers.

30. The fluid purification system of claim 29, wherein said alumina nanofibers are present in amounts ranging between 2 and 3% by weight, based upon the total weight of the first rigid porous purification block.

31. The fluid purification system of claim 1, wherein the first rigid porous purification block comprises 100% porous material polymer.

32. The fluid purification system of claim 10, further comprising:

a coating on the longitudinal first surface of the rigid porous purification block, comprising a high density polymer.

33. The fluid purification system of claim 32, wherein said coating has a thickness that is 1/40 to 1/30 of the thickness of the rigid porous purification block.

34. The fluid purification system of claim 32, wherein the coating comprises high density polyethylene.

35. The fluid purification system of claim 2, wherein the fourth fluid purification media comprises carbon particles that have an average particle size in the range of 10-200 µm.

36. The fluid purification system of claim 2, wherein the fourth fluid purification media comprises carbon particles that have a size distribution such that 5-25% by weight of the particles are smaller than 325 mesh and 7% by weight of the particles are larger than 80 mesh.

37. The fluid purification system of claim 2, wherein the fourth fluid purification media comprises carbon particles that are obtained by reacting wood-based carbon with strong acid under pressure, to obtain acid-reacted carbon, and heating the acid-reacted carbon in a gas atmosphere.

38. The fluid purification system of claim 2, wherein the fourth fluid purification media comprises carbon particles that have an average particle size in the range of 10-200 µm;
carbon particles that have a size distribution such that 5-25% by weight of the particles are smaller than 325 mesh and 7% by weight of the particles are larger than 80 mesh; and
carbon particles that are obtained by reacting wood-based carbon with strong acid under pressure, to obtain acid-reacted carbon, and heating the acid-reacted carbon in a gas atmosphere.

39. The fluid purification system according to claim 1, wherein the second fluid purification media comprises microglass structural fibers.

40. The fluid purification system according to claim 39, wherein the second fluid purification media further comprises aluminum fibers or particles or aluminosilicate fibers or particles disposed on, among, or in the microglass structural fibers.

41. The fluid purification system according to claim 1, wherein one or more of said pleats comprise a leg having a length ranging from 6-18 mm.

42. The fluid purification system according to claim 41, wherein said length of said pleats ranges from 7 to 10 mm.

43. The fluid purification system according to claim 39, wherein the second fluid purification media further comprises particles of porous carbon having a porosity of 50-90%.

44. The fluid purification system of claim 1, wherein the first rigid porous purification block has a thickness that is at least 4.5 times a thickness of the fibrous, nonwoven fabric.

45. The fluid purification system of claim 44, wherein the first rigid porous purification block has a thickness that is at least 7 times the thickness of the fibrous, nonwoven fabric.

46. The fluid purification system of claim 45, wherein the first rigid porous purification block has a thickness that is at least 8.75 times the thickness of the fibrous, nonwoven fabric.

47. A fluid purification apparatus comprising the fluid purification system of claim 1.

48. A method of removing contaminants from water, comprising contacting the water with the fluid purification system of claim 1 at a pressure of 7-10 psi.

49. The method of claim 47, which comprises reducing the bacteria content of the water by 99.99% using a flow rate of at least 1000 $cm^3$ per minute with an inlet pressure of 10 psi.

50. A method of reducing scale in water processing equipment, comprising contacting water with the fluid purification system of claim 1 prior to or during contact of the water with said water processing equipment.

51. The method of claim 50, wherein said water processing equipment comprises a heat exchanger.

52. An appliance comprising:
- an input water line; and
- a fluid purification system according to claim 1 disposed in said input waterline.

53. The appliance of claim 52, wherein the appliance is a refrigerator, an ice maker, an automatic dishwasher, or a laundry washer.

54. A fluid purification system, comprising:
- a first fluid purification media comprising a first rigid porous purification block, comprising:
  - a longitudinal first surface;
  - a longitudinal second surface disposed inside the longitudinal first surface; and
  - a porous high density polymer disposed between the longitudinal first surface and the longitudinal second surface;
- a second fluid purification media, comprising a pleated fibrous, nonwoven fabric disposed adjacent to the first surface of the first fluid purification media, the second surface of the first purification media, or both, wherein the fibrous nonwoven fabric of the second fluid purification media is folded to form a plurality of pleats, and comprising an active material disposed on, among, or in the pleated, fibrous, nonwoven fabric;

wherein:
- the longitudinal first surface has a first transverse dimension;
- the longitudinal second surface is an inner surface having a second transverse dimension; and
- the ratio of the first transverse dimension to the second transverse dimension is in the range of 1.2 to 3.5, and
- the difference between the first transverse dimension and the second transverse dimension is the thickness of the porous purification block.

55. The fluid purification system of claim 54, wherein the ratio is in the range of 1.2 to 2.5.

56. The fluid purification system of claim 54, wherein the ratio is in the range of 1.2 to 2.3.

* * * * *